United States Patent [19]

Hird

[11] Patent Number: 4,506,336
[45] Date of Patent: Mar. 19, 1985

[54] POINT LOCATION AND GRAPHICS DISPLAY APPARATUS

[76] Inventor: Edwin A. Hird, 10200 DeSoto Ave., #331, Chatsworth, Calif. 91311

[21] Appl. No.: 189,754

[22] Filed: Sep. 23, 1980

[51] Int. Cl.[3] .............................................. G06K 11/00
[52] U.S. Cl. ...................... 364/518; 33/1 M; 178/18; 340/710; 340/727; 364/520; 364/561
[58] Field of Search ............... 178/18, 20; 33/1 N, 33/1 M, 1 CC, 1 SP, 1 PT, 137 R, 140, 141.5, 142; 340/707, 709, 710, 723, 724, 725, 726, 727, 728, 729, 730, 731, 747; 377/17, 18; 364/518, 520, 552, 559, 560, 561, 562

[56] References Cited

U.S. PATENT DOCUMENTS

| 707,862 | 8/1902 | Netherland | 33/139 |
|---|---|---|---|
| 2,160,130 | 5/1939 | DeLisle | 33/79 |
| 2,249,707 | 7/1941 | Frost | 33/138 |
| 2,553,613 | 5/1951 | True | 33/139 |
| 2,824,374 | 2/1958 | Abrams et al. | 33/140 |
| 2,854,753 | 10/1958 | Caparros | 33/139 |
| 3,526,890 | 9/1970 | Malina et al. | 33/141 |
| 3,749,893 | 7/1973 | Hileman | 364/520 X |
| 4,053,985 | 10/1977 | Spentzas | 33/142 X |
| 4,058,849 | 11/1977 | Fitzgerald et al. | 364/520 |
| 4,135,245 | 1/1979 | Kemplin et al. | 364/520 |
| 4,178,691 | 12/1979 | Tateishi | 33/139 |
| 4,186,490 | 2/1980 | Quenot | 33/139 |
| 4,201,911 | 5/1980 | Dering | 377/17 X |
| 4,283,765 | 8/1981 | Rieger | 364/520 X |
| 4,419,672 | 12/1983 | Hird | 346/33 M |

Primary Examiner—Errol A. Krass
Assistant Examiner—Edward R. Cosimano

[57] ABSTRACT

A point location and graphics display system wherein a digitizer, (10) having an inner housing (14) rotatably retained in an outer housing (12), includes a rolled, flexible steel tape (34) extendable from the inner housing (14) about a roller (40) and having a stylus (76) on its outer extremity. Roller sprockets (119) engage sprocket holes (118) in the tape (34) and pass through a straightener (166) and a cleaner (168). Angle encoder (18) and linear encoder (46), respectively driven by rotation of the tape (34) in the inner housing (14) and by linear movement of the tape (34), provide signals to a computer (54) which digitizes and supplies those signals to an upright visual display (58) or a desktop display (308). A desk (356) is sometimes provided, with a menu (376), an alphanumeric keyboard (262), a digital display (366), a function keyboard (328), a recorder (302) and its controls (304), view-rotating dials (396–400) and color selection dials (404–408). The stylus (76) may be provided with a cursor guide (434) having a clamp (440) for a writing instrument (78).

33 Claims, 21 Drawing Figures

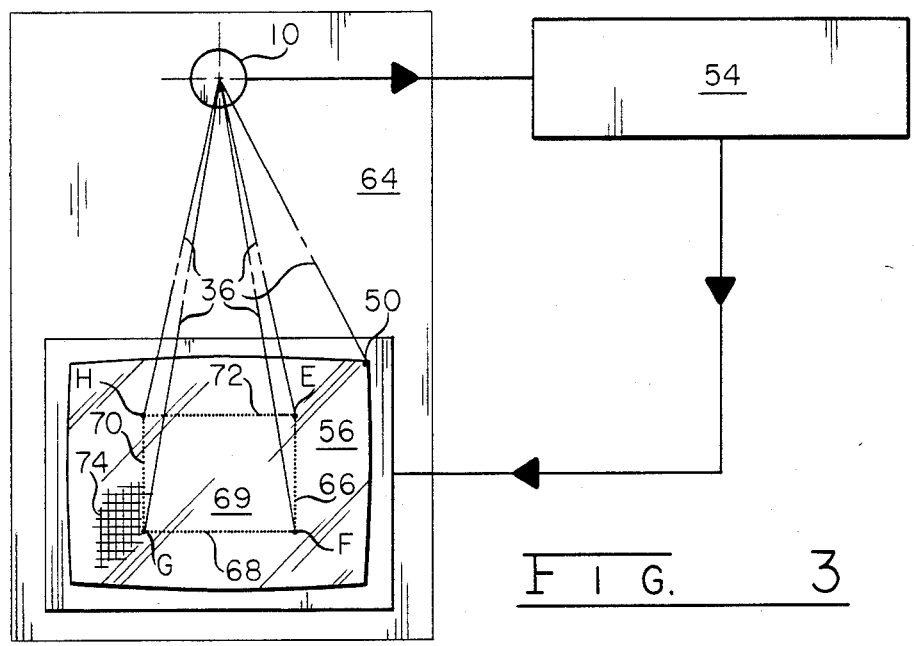
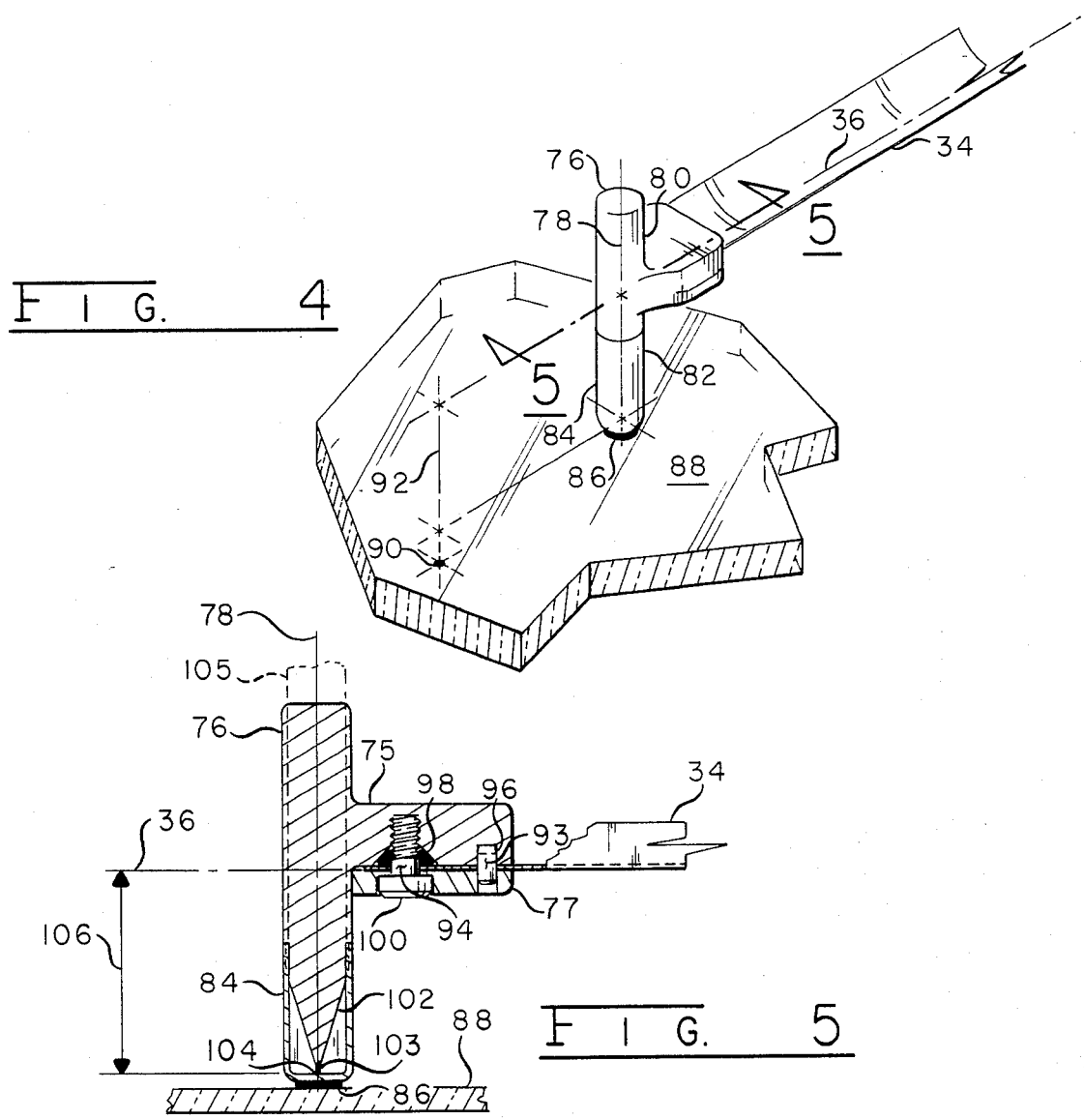

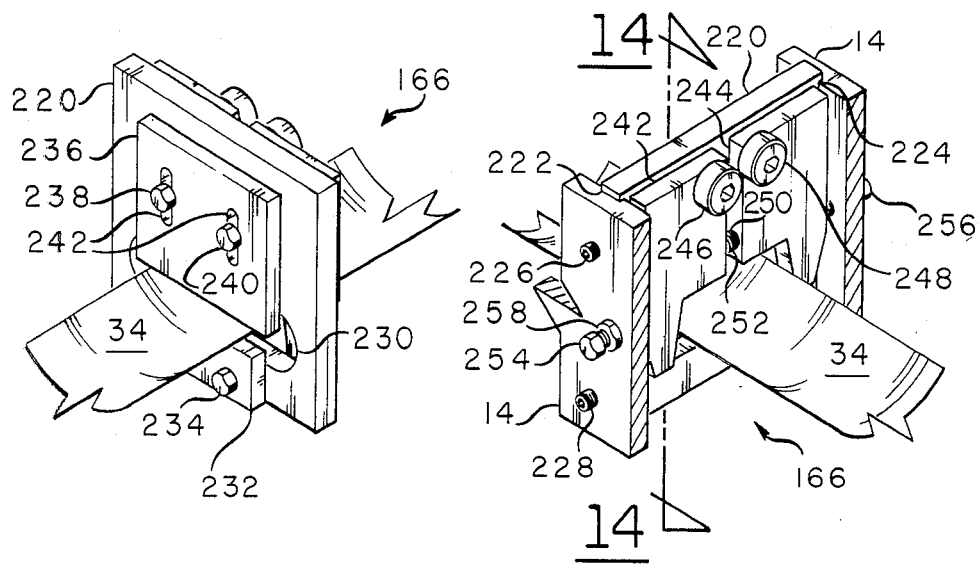
FIG. 14
FIG. 13
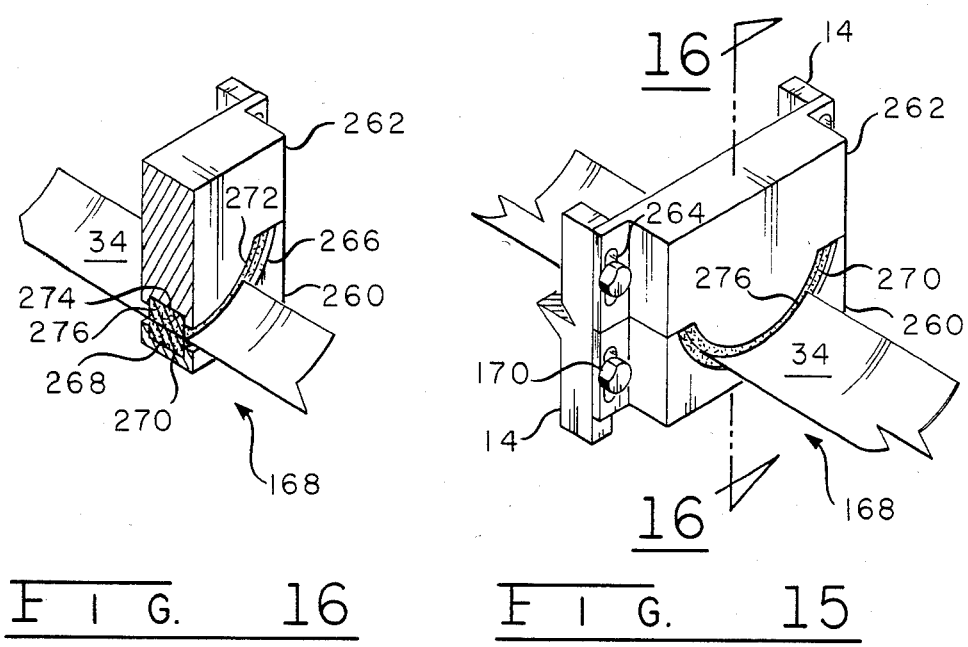
FIG. 16
FIG. 15

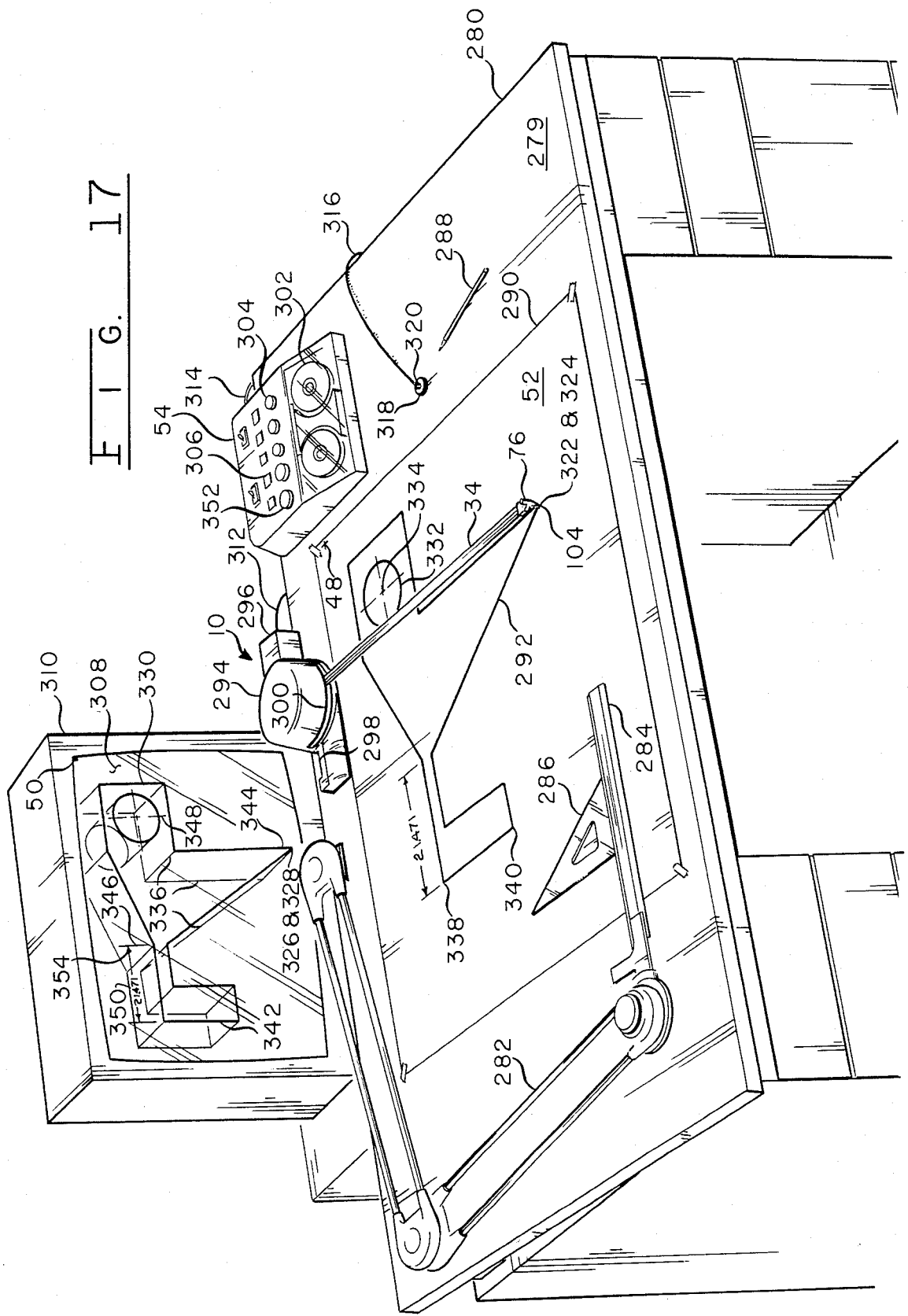

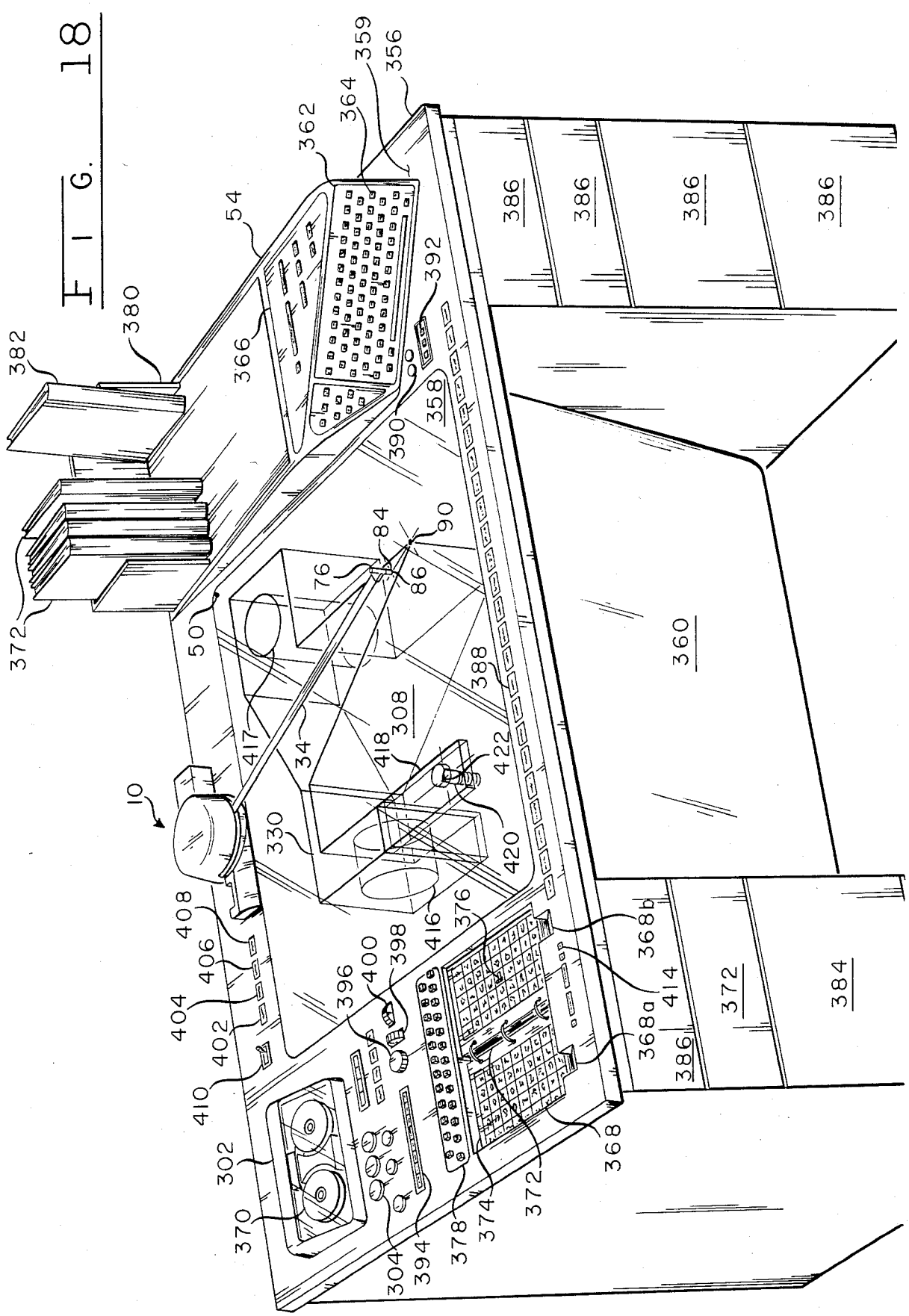

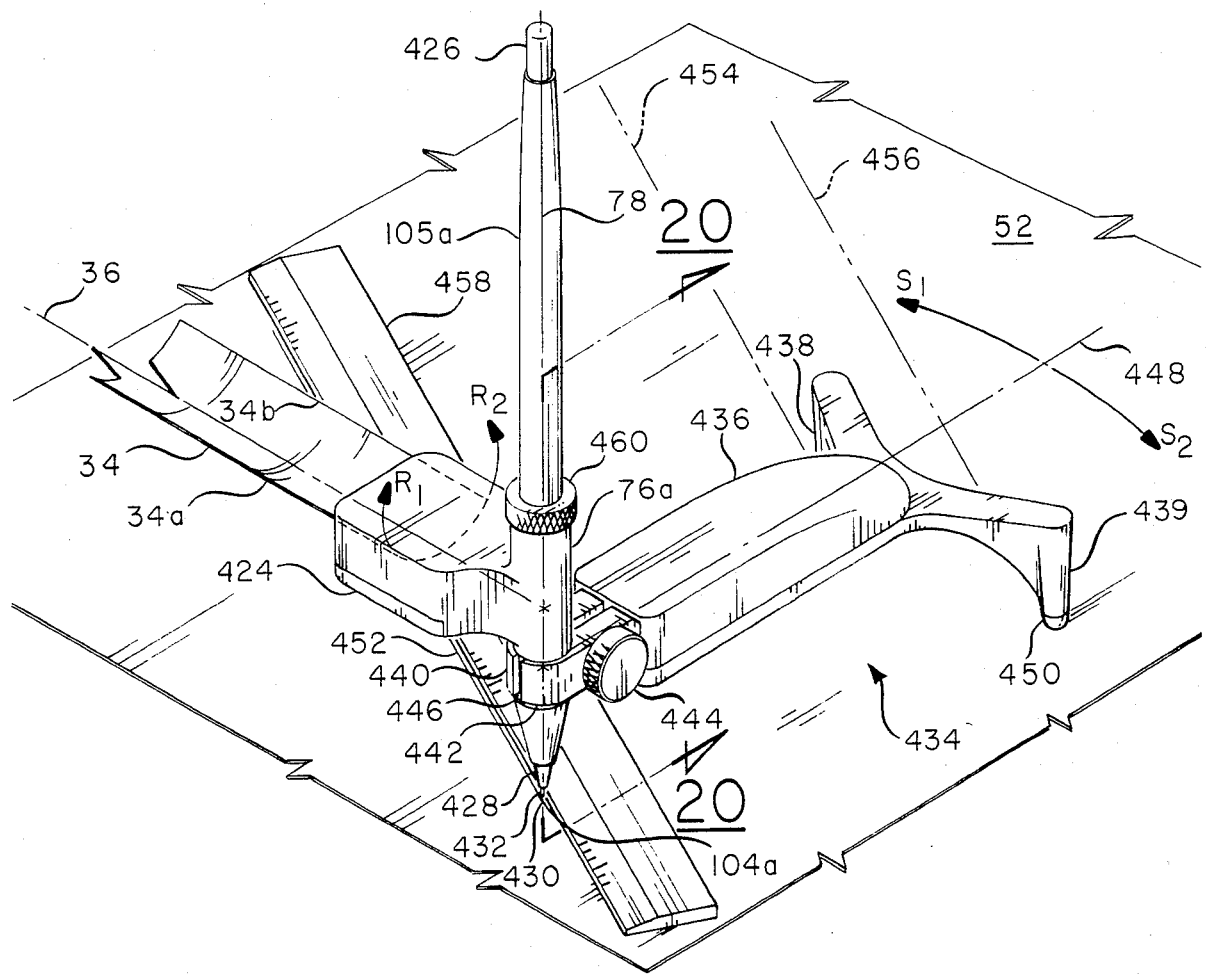
FIG 19
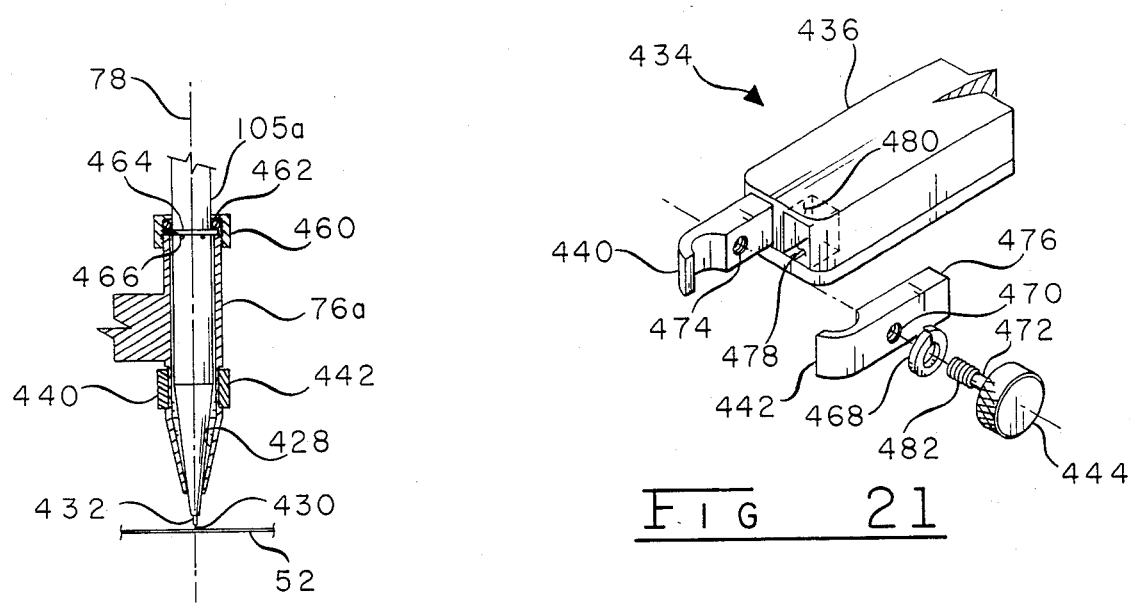
FIG 20
FIG 21

POINT LOCATION AND GRAPHICS DISPLAY APPARATUS

Reference is made to applicant's two U.S. patent applications: Ser. No. 702,745, filed July 6, 1976, and Ser. No. 783,608, filed Apr. 1, 1977; each of these applications, and this application, involves producing linear measurements by interconverting linear and rotary motions, and involves a thin, cross-sectionally curved drive member whereby the interconversion method is of prime importance; also referenced is application Ser. No. 06/392,342, filed June 25, 1982, using yet another linear and rotary interconversion technique.

Application Ser. Nos. 702,745, and 392,342 are pending. Application Ser. No. 783,608 was issued as U.S. Pat. No. 4,419,672 on Dec. 6, 1983. Application Ser. No. 702,745 and U.S. Pat. No. 4,419,672 teach a friction drive interconversion system, and U.S. Pat. No. 4,419,672 also teaches rotation means for polar coordinates. This application and application Ser. No. 392,342 each teach different but improved interlocking drive interconversion techniques thus producing more accurate linear measurements, therefore, also producing more accurate polar measurement coordinates.

TECHNICAL FIELD

This invention, in the technical field of computer graphics, relates to an apparatus for providing accurate point location information, particularly in relation to polar coordinates of information on a surface such as drawing data, for transferring that information, through conventional computers and computer logic, to a graphics display, for producing any desired point location information directly upon or within the internal functions of the graphics display itself.

BACKGROUND ART

Graphics displays have become prominent in the computer graphics visual technologies and commonplace for the projection of variegated displays, from letters and words and to extremely intricate technical drawings and data. Some of the components currently used to produce such images are: cathode ray tubes, light-emitting diodes, liquid-crystal electroluminescence devices, and devices utilizing magnetic-particle, plasma, electrochromic, and dye-foil.

The display area of a graphics display generally incorporates an abundance of horizontal and vertical lines of pixels comprising a Cartesian coordinate system. The word pixel originates from the words "picture element" because the pixels, when energized, form the picture seen in the graphics display. Since each pixel is at the intersection of horizontal and vertical lines of pixels, each represents a point that is addressable using Cartesian coordinates. Therefore, each pixel is known as an addressable point.

Therefore, the image produced on a graphics display consists of a series of pixels that have been addressed by a computer to produce a visual display of a specific image. The computer, in turn, receives its commands either from hand or electronic tabulation, such as programming, or directly from an electro-mechanical apparatus, such as is described below relative to this invention, or a combination of both.

In current practice it is common to use digitizers to convert coordinate information into computer-acceptable form for transfer into a graphics display. Some digitizers utilize horizontal and vertical printed circuit wires embedded beneath a flat surface. Electrical induction of coordinates, in such systems, is induced by a wire-wound cursor element. The coordinates, which represent an addressable point, are usually determined with a microprocessor and conducted to a computer. It is obvious that working directly upon a graphics display is not possible with this configuration, since effort must be performed separately on a special printed circuit table while intermittently viewing the graphics display. With such a system the location of coordinates, other than on a surface directly backed with a printed circuit, is not possible.

Another conventional digitizing technique employs a "light-pen," an electronically induced pen-like instrument that must be placed directly upon the display. It emits a light, or spot, within the display area at the "light-pen" point of contact. Contrary to the above-described "printed-circuit" practice, the "light-pen" technique is limied only to the graphics display area. A computer program is then designed to determine the coordinates of the light spot emitted so that its location can be signaled to the computer. The "light-pen" technique cannot be utilized to determined coordinate points on such as a drawing positioned on a table and to transfer these to a graphics display.

Still another digitizer method uses a horizontal arm attached to the upper edge of a table. A vertical arm, coupled with and movable along the horizontal arm, travels from side to side over the surface of the table. The vertical arm contains a stylus-like instrument which, when placed upon a point and a corresponding button is depressed to complete the circuit, causes a computer to determine the x-y coordinates of the point. It may be visualized that the use of this system is extremely restrictive; i.e., to a specific table designed to accept the arm members which support the device containing the stylus.

SUMMARY OF INVENTION

With this invention, a small and compact digitizing device can be clamped to any table or surface. That surface need not be "backed" by electronic devices, such as a printed circuit and microprocessor, and it need not be only that of a visual display. Nevertheless, the device is capable of digitizing over a broad surface area the coordinates of successive points represented as a part of that surface.

Certainly, it is noted that any surface contains infinite theoretic points, and that any distance, such as an inch, is a theoretic distance between two theoretic points that, also, are seperated by infinite points. With reality, no realistic device can measure to distinguish between nor even approach such theoretic values. As such, it should be understood that the device of this invention, as with any other, is governed by obvious realistic tolerances of the combined components, systems or processes used.

BRIEF DESCRIPTION OF DRAWINGS

FIG. 3 is a block diagram representing means for the direct display of coordinate pixels;

FIG. 4 is an isometric view of a stylus attached to a steel tape;

FIG. 5 is an orthographic sectional view taken along line 5—5 of FIG. 4;

FIG. 13 is an isometric view of a tape straightener portion of the invention;

FIG. 14 is a view taken along the line 14—14 of FIG. 13;

FIG. 15 is an isometric view of a steel tape cleaner;

FIG. 16 is a cross-sectional view taken along line 16—16 of FIG. 15;

FIG. 17 is a perspective view showing the invention used with conventional design and drafting equipment;

FIG. 18 is an illustration of the digitizer of this invention utilized with conventional audio/visual electronic equipment;

FIG. 19 is an isometric view depicting a writing instrument and cursor guide which are sometimes used with this invention;

FIG. 20 is a sectional view of the writing instrument retainer taken along line 20—20 of FIG. 19; and FIG. 21 is an exploded isometric view of a portion of the cursor guide.

BEST MODE FOR CARRYING OUT THE INVENTION

Figure 1:
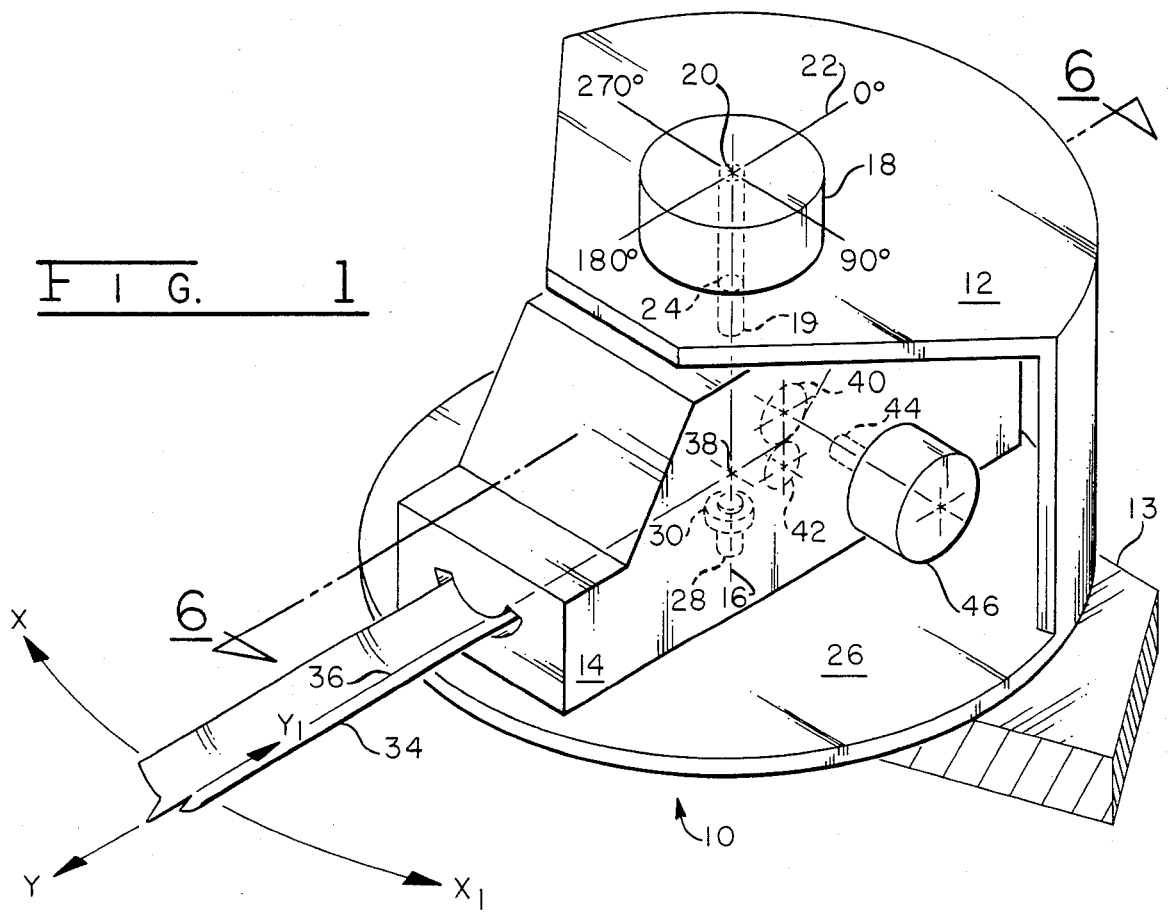
FIG. 1 is an isometric block diagram depicting the basic digitizing scheme of this invention.

The term "encode" means "to transfer from one system of communication to another." Polar coordinates, a significant concept relating to the primary utility of this invention, are defined as numbers that locate a point in a plane by the distance of that point from another fixed point on a line, and the angle that this line makes with another fixed line. Looking now at the isometric block style presenatation of FIG. 1, a basic digitizing mechanism of this invention for producing polar coordinates is depicted. Therein, the digitizer 10 of the invention has a stationary outer housing 12, usually clamped to a surface 13. It contains a laterally rotatable inner housing 14 which rotates about an axis 16. An encoder 18 is mounted upon an upper surface of the housing 12.

Figure 2:
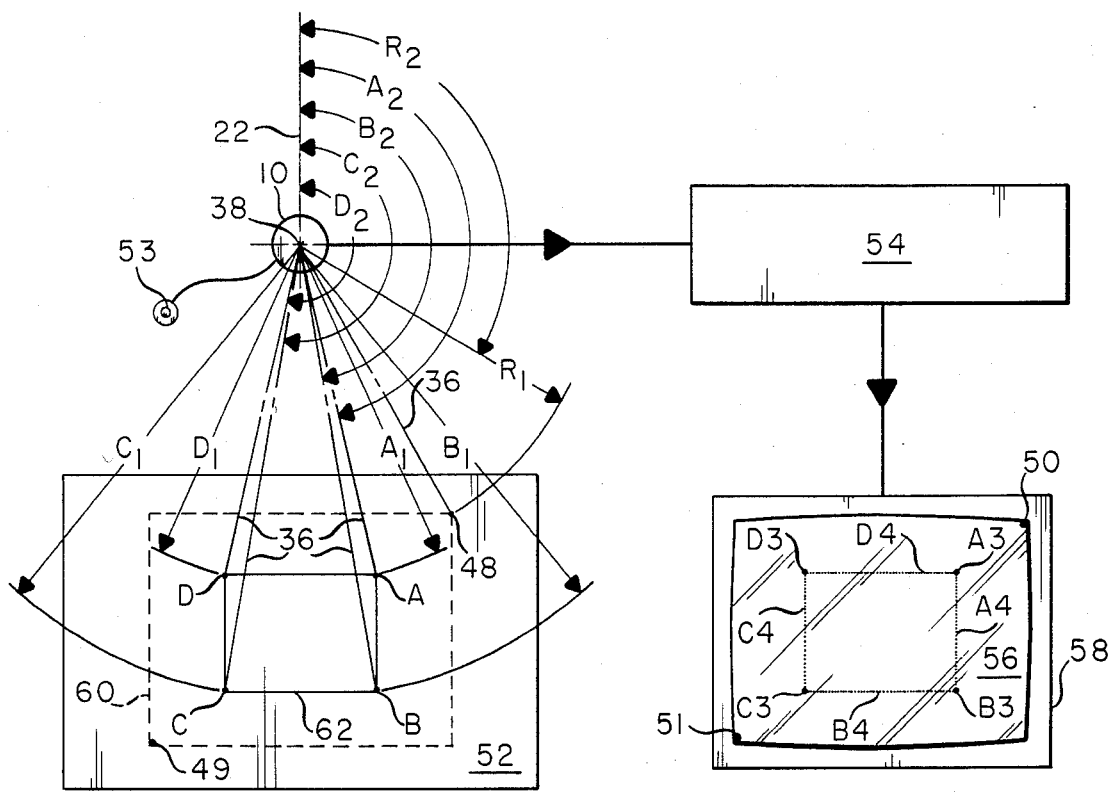
FIG. 2 is a schematic block diagram illustrating the invention with a computer to convert coordinates from a paper to an electronic visual display.

The encoder 18 may be either a conventional photoelectric encoder, whereby photoelectric cells are utilized to electrically measure the degree of rotation of a shaft 19 which extends therefrom along the axis 16, or it can be a potentiometer, whereby electrical resistance elements ae utilized to electrically measure the degree of rotation of its shaft 19, or it may be any encoder device capable of electrically measuring the degree of rotation of its shaft. The encoder 18 is mounted on the outer housing 12 such that, as to its electrically measurable degrees of rotation, the 0° position is oriented toward the rear of the outer housing 12. The reason for this, if the encoder 18 is a potentiometer, for example, is that the 0° electrical reading for such a device is extremely difficult to find. In such a case 90° to 270° degrees of rotation will be utilized. Since these are in the middle of a potentiometer's resistance scale they are easier to electrically determine. Also, 0° is often-times preceded by a dead band within potentiometers. Therefore, FIG. 2 illustrates the degrees of rotation measured by the encoder 18 in a clockwise direction, for illustrative purposes only, since such a device can be electrically connected to measure rotation in either a clockwise or counter-clockwise direction.

The center of rotation 20 of the shaft 19, (FIG. 1) to 0°, is a fixed line 22. It is from this line 22 that all degrees of lateral rotation of inner housing 14 are measured.

The shaft 19 is connected to the inner housing 14 at connection 24. At this point the shaft 19 is fixed to, or is integral with, the inner housing 14. At the opposite end of axis 16, and embedded in a base or floor 26 of the outer housing 12, is a shaft 28 coaxial with the axis 16. The shaft 28 is mounted in a bearing 30 fixedly imbedded in or integral with the floor of the inner housing 14.

It will now be recognized that the inner housing 14 is rotatable laterally about axis 16 within the housing 12. Its rotational movement is measured electrically by the encoder 18.

Rolled up and contained within the inner housing 14 is a curved flexible steel tape 34. It is designed and constructed to be pulled out of or pushed into the inner housing 14, usually by hand. The centerline 36 of steel tape 34 bisects axis 16 at vertex 38 and passes between, makes contact with, and drives two rollers 40 and 42. The axis of the roller 40 is coaxial with a shaft 44 of a second encoder 46 mounted on the wall of the inner housing 14. The encoder 46 is a multi-revolution measuring device, such as a transducer shaft angle encoder, multi-turn potentiometer, or the like, to electrically measure multiple revolutions of its shaft 44.

When the steel tape 34 is pushed into or pulled out of the inner housing 14, it causes the roller 40 to rotate. This, in turn, rotates the shaft 44, that rotation being electrically measured by the encoder 46. The travel distance of the steel tape 34 is measured by the encoder 46, as controlled by the diameter of roller 40. Each revolution of the roller 40 results in one revolution of the encoder 46. If the roller 40 has a diameter of one inch, for example, then the steel tape 34 travels a distance of one times Pi, or 3.14159 . . . inches.

This background makes it possible to recognize that the digitizer 10 will define and measure the polar coordinates of any point on the centerline 36 of the steel tape 34 as it is pulled (in the y direction) or pushed (in the $y_1$ direction) and rotated laterally (in the x and $x_1$ directions). The encoder 46 thereby locates the distance of the point from the fixed point vertex 38 on the centerline 36. The encoder 18 determines the angle that centerline 36 makes with respect to the fixed line 22. The combination of these two electrical measurements define the polar coordinates of such a point.

The schematic block diagram of FIG. 2 illustrates the manner in which this invention is utilized to convert coordinates of a drawing on a paper surface to analogous coordinates within an electronic visual display by means of a conventional computer. It additionally shows the means by which completion of the drawing is accomplished with pre-programmed information stored within the computer.

Reference points 48 and 49, on drawing surface 52, are representative of the extremities of visual display 56 shown in cabinet 58. They are polar coordinates that are fed from the digitizer 10 to a computer 54, where they are converted, by well known mathematical logic, to Cartesian coordinates and illustrated as reference points 50 and 51 within the visual display 56.

The tip of the steel tape 34, shown representatively only by its centerline 36 in FIG. 2, is extended from a fixed point vertex 38 within the digitizer apparatus 10 to the reference point 48 on drawing surface 52. The coordinates of this point are determined by the distance $R_1$, from the vertex 38, to the reference point 48, and by the angle $R_2$ (shown displaced from the actual line) that the steel tape centerline 36 makes with fixed line 22. These reference point coordinates are fed to the computer 54, which is programmed to display all succeeding coordinates in relationship to the reference point 48, below it and to its left. The dashed line 60 on drawing surface 52 represents, to the operator, the corresponding display area of the visual display 56. It can be of any proportional size relationship to the visual display 56.

Shown on the drawing surface 52, for purposes of explanation, is a drawn rectangle 62. The rectangle corners or coordinates are identified by the legends A,B,C, and D. In the procedure of coordinate determination, the tip of the steel tape centerline 36 is sequentially extended to each of these rectangle corners. The polar coordinates for corner A are determined by distance A, and angle $A_2$; corner B's coordinates are determined by distance $B_1$ and angle $B_2$; C is determined by distance $C_1$ and angle $C_2$; and D is determined by $D_1$ and $D_2$. Each time the tape tip is moved to the coordinates of a corner a command is activated by depressing a pushbutton 53. The coordinates of that corner than are determined by the digitizer 10 by the production of electrical signals which are fed to computer 54 and converted to Cartesian coordinates. These signals are then directed to corresponding coordinate pixels $A_3$, $B_3$, $C_3$, or $D_3$ within the visual display 56. Then, with a commercially available pre-programmed computer graphics logic program stored in the computer 54, a series of digital lines $A_4$, $B_4$, $C_4$, and $D_4$ can be generated to connect the coordinate pixels so established. The rectangle 62 shown in FIG. 2 is used for illustrative purposes only. In practice, such a rectangle is stored in virtually any computer graphics program and may be instantaneously recalled from storage and displayed in any size or rotation. For purposes of visibility and case of operation a continuous light spot (moving pixel effect) can be made to travel over the surface of the display 56 as the tip of the steel tape 34 (FIG. 1) is moved.

With FIG. 3, the polar coordinate digitizer 10 is located upon the same plane 64 as the visual display 56. The tip of the steel tape centerline 36 is extended directly to the visual display area reference point 50 and the computer programming logic is provided the instruction that all succeeding coordinates will be in relationship to the reference point 50. Again, this is common practice with contemporary digitizing for visual display image representation.

The tip of the steel tape centerline 36 is progressively extended to those pixel locations illustrated as E,F,G, and H. It should be noted that this function varies from that described for FIG. 2, i.e., the rectangle 62 of FIG. 2, is designed and drawn upon a separate drawing surface 52, whereas in FIG. 3, it should be assumed that the rectangle has yet to be designed.

In the latter instance it will be obvious that the location of the rectangle 69 within the visual display area must be determined, along with its height and width. Pixel E can then be entered upon the display as described. At this time, pre-programmed information stored within the computer 54 can be used to instantly recall and display a rectangle with pre-determined dimensions, or the coordinate pixels for the sides and corners can be determined, established, and displayed. Alternatively, a combination of stored capabilities and digitizing steps can be performed from conventional data stored in the form of programs, accessable with menus, i.e., a quantity of separate key pictures or words used to identify a program for a specific image. Such data is catagorized as to subject matter and is keyed to computer storage for recall. The digitizing operator, through manipulation of such stored data and digitizing techniques, can also formulate new data that can be stored in menu form, adinfinitum. Therefore, using a combination of stored data and/or digitizing techniques as described, the rectangle with sides 66, 68, 70, and 72 is displayed. Such a display area, to aid in digitizing, may contain a grid 74, the lines of which are oriented horizontally and vertically, or diagonally, and may consist of any number of segments.

Moving now to FIGS. 4 and 5, there is shown a stylus or cursor element attached to the end of the steel tape. This element, which is used with this invention, is handled in a manner akin to that of a slide trombone. When used directly upon a graphics display or glass surfaces it can be preceded by the coordinates of pixel points as it is drawn over the surface of the glass, or it can be used as a stylus directly above such a pixel point, as will be described in relation to FIG. 5.

With FIG. 4, a stylus 76 is attached to the previously described steel tape 34 so that the centerline 78 of the stylus 76 is aligned with and perpendicular to the centerline 36 of the steel tape 34. Their upper and lower extremities 80 and 82 are normally used for grasping the stylus by the first and second forefingers for a pulling action, while its frontal plane is normally used for a pushing action by the thumb. Attached to the lower extremity 82 is a snapped-on or screwed-on cover 84. At the base of the cover 84, a pad 86 is attached to prevent the stylus 76 from scratching or marring a cover-glass 88 of the visual display 56.

As the stylus 76 is manipulated to extend, retract, and rotate the steel tape 34, it can be preceded by a dot 90 that is energized within the display area. The dot 90 is shown as such for illustrative purposes and can be a pixel point or a series of such points, depending upon the resolution density of such pixel points within the display area. It can take any shape or combination of shapes and is in alignment with the steel tape centerline 36. It is also in an axis 92 that is parallel with, but displaced in advance of the stylus centerline 78. Although I will later provide a detailed description of the procedure whereby the dot 90 electronically leads the stylus 76, it will be understood that all electronic interaction for this invention takes place within the digitizer 10 and computer 54.

FIG. 5 shows the steel tape 34 as being clamped between a rear upper extension member 75 and a lower plate 77 of that extension member. Two holes 93 and 94 are employed on the centerline 36 of steel tape 34 in alignment with the centerline 78 of the stylus 76. The hole 93 is used for a close fitting dowel pin 96 embedded into the rear upper extension 75. An O-ring 98 squeezeutilized to back up the steel tape 34 as a retention means is used to prevent any back and forth or lateral slippage of the stylus 76 with respect to the steel tape 34. It is determined that the inherent frictional resistance in the O-ring 98 will overcome the slight pressure required to drive the steel tape 34 to assume their aligned positions. A machine screw 100 secures this entire clamping arrangement together, but permits easy removal should it be necessary that any other type of stylus or cursor be substituted.

Inside of the cover 84 the stylus 76 is tapered, as at 102, to a straight shank 103 having a tip 104. When the cover 84 is removed, the tip 104 is utilized for digitizing operations, as described in relation to FIG. 2, whereby the signal coordinates, the pixel, or the dot 90 (FIG. 4) does not preceed the stylus. With such digitizing, the tip 104 can be considered synonamous with the phrase "tip of the steel tape centerline 36," used in the description of FIGS. 2 and 3. The taper 102, the shank 103, and the tip 104 can be a writing instrument 105 used to draw or to design layouts, such as the rectangle shown in FIG. 2, and also to produce coordinate points simultaneously.

The distance 106 between the steel tape centerline 36 and the bottom of tip 104 is the same as the distance in FIG. 1 between the steel tape centerline 36 and the bottom of the outer housing 12. A substantially parallel relationship is thereby maintained between the drawing surface and the steel tape. When the stylus 76 is used with the cover 84, and the dot 90 precedes the stylus 76, the extra height difference between the bottom of tip 104 and the bottom of the pad 86 is inconsequential since the dot 90, in that case, is representative of the polar coordinates for distance. When the stylus 76 is used without the cover 84, then tip 104 is representative of such distance.

The tip 104, consisting of an appropriate material, e.g. Nylon, that will not mar the surface of the visual display, may also be used directly upon cover glass 88 signifying distance at tip 104. Also, it is obvious that a tip 104, with a sharp point, may be used for scribing, such as for pattern making.

Figure 6:
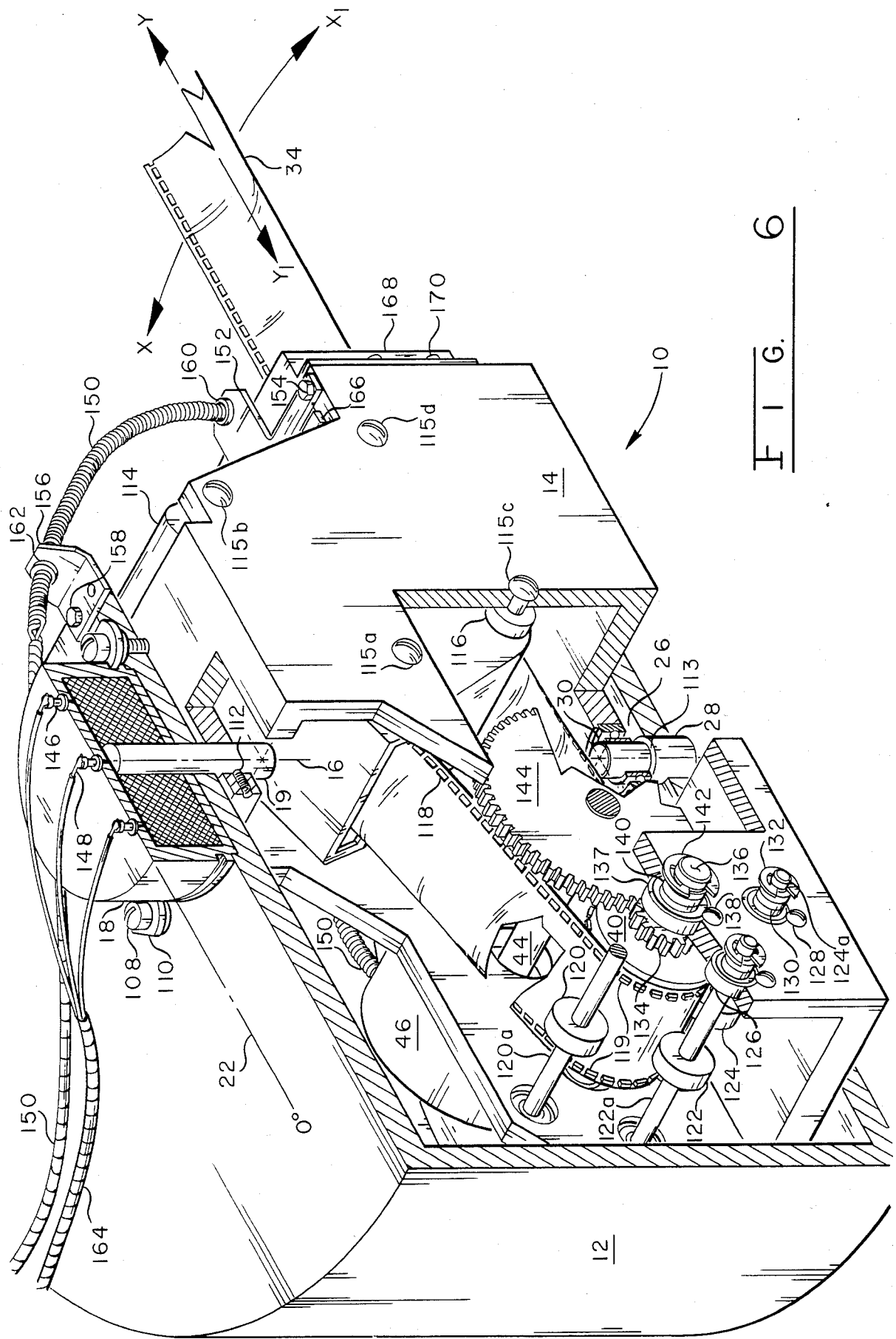
FIG. 6 is an isometric view taken along line 6—6 of FIG. 1.

FIG. 6, which is an isometric view taken along line 6—6 in FIG. 1, representatively shows the digitizer 10 in greater detail. Some slight variations in configuration will be described. It also depicts detailed working relationships of components, as required to make the digitizer operable. This cross-sectional view has been altered as necessary to illustrate complete views, for purposes of clarity.

The digitizer 10, illustrated as an operable model wherein parts previously described carry the same nomenclature numbers, shows a mechanism in which the inner housing is laterally rotatable within the outer housing 12 about the axis 16. The encoder 18 is clamped to the outer housing 12 with three or more sets of machine screws 108 and mounting cleats 110. The encoder shaft 19 is joined to the inner housing 14 with a set screw 112. The shaft 28 in the floor 26 is "stepped" to define a shoulder 113 to support the bearing 30, all upon the common axis 16 about which the inner housing 14 rotates.

The inner housing 14 contains a steel tape case 114 held in place with four machines screws 115 a-d. These screws penetrate holes in the two opposite vertical walls of inner housing 14 and are usually secured on the opposite side in a standard manner with washers and nuts (not shown). The steel tape case 114 is centered within the outer housing 14 by a plurality of spacers 116, on each side of steel tape case 114. Centered within the steel tape case 114 is the rolled, flexible, curved, steel tape 34 which is extensible from and retractable into the steel tape case 114.

A conventional "push-pull" variety of the tape/housing unit is usually selected for use with this invention. The tape in such a unit will not snap back into the case when released. Rather, it remains motionless until a slight pressure is exerted on the tape to extend it further or to push it back into its case. Under certain circumstances, however, because of external pressures on the tape, a "power return" or a combination of that well known system and the "push-pull" system may be utilized. An objective is that the steel tape does not snap back into the case in an uncontrolled manner.

The steel tape 34 is usually perforated along at least one edge with a continuous series of sprocket holes 118 designed to mesh with sprockets 119, which are an integral portion of a roller 40 near one extremity of the inner housing 14. It is sandwiched between the roller 40 and three guide rollers: a top roller 120; a rear roller 122; and a bottom roller 124. These rollers guide the steel tape 34 around the roller 40 in firm engagement therewith. Each such guide roller is affixed to one of the shafts $120_a$, $122_a$ and $124_a$, respectively, freely rotatable within suitable bearings 126, which are fitted within the walls of the inner housing 14, and are retained by bearing rtainers 128. The roller shafts are centered and held in place with spacers such as 130 secured by retaining rings 132.

FIG. 6 illustrates an embodiment differing from that of FIG. 1. Whereas the roller 40 of FIG. 1 has a shaft which turns the encoder 46, FIG. 6 depicts the roller 40 as being geared to the shaft 44 of the encoder 46. The latter embodiment requires fewer turns of the encoder 46.

The roller 40, the sprockets 119, a pinion gear 134, and the shaft 136 are all preferably integral and rotate freely within a pair of bearings 137 retained by bearing retainers 138. The assembly of roller 40 is centered within the inner housing 14 by spacers 140 and retaining rings 142, similar to the rollers 120-124.

Aligned to mesh with the pinion gear 134 is a spur gear 144 pinned or otherwise appropriately secured to the shaft 44 of the encoder 46. Encoder 46 is mounted to the far wall of inner housing 14 with a plurality of machine screws and cleats (not shown) in the same manner as the mounting of the encoder 18. Its shaft 44 has been shown sectioned for clarity. It penetrates a bearing (not shown) retained in the near wall of the inner housing 14.

It will be recognized that the configurations shown may be departed from in certain particulars without departing from the spirit or scope of the invention. For example, the tape case 114 may be oppositely oriented, to feed the tape 34, directly toward its outlet direction, between a large roller and one or more guide rollers. In such event the tape case 114 normally feeds the tape 34 at an angle approximating 30° above the horizontal, thereby permitting the tape to fit snuggly against and around the large roller. The large roller is usually made of a relatively hard thermoplastic material having minimal wear qualities because the pressure in pulling the tape is against this roller. The guide roller, on the other hand, is elastomeric and resilient.

The important concept to be maintained is that the tape together with the other components making up a drive means for the encoder, provide an accurate mechanism in its relationship of parts, providing a reliable reading accuracy irrespective of the specific means used to accomplish the drive function.

The encoder 18 includes a plurality of terminal posts 146 having wires 148 connected thereto. More terminals and wires are sometimes utilized, depending upon the circuitry chosen. A wire bundle 150 leads around the inner housing 14 and is retained by a clamp 152, secured by machine screws 154, and a clamp 156 retained by a screw 158. It is flexible, extensible, and retractable therebetween so as to move with the lateral movement of the inner housing 14. Clamps 152 and 156 contain grommets 160 and 162 to secure the wire bundle 150 while facilitating its movement in a manner minimizing its susceptability to breakage.

The wire bundle 150 leading from the encoder 46, and a second bundle 164 leading from the encoder 18, lead to the computer 54, as shown in FIGS. 2 and 3. Conventionally, such wires lead to electronic components such as voltage comparators, compensators, voltage dividers, analog to digital converters and the like (shown in applicant's copending patent application entitled "A measuring conversion and visual display instrument, Ser. No. 702,745.) Such computer circuitry within the computer 54 (FIGS. 2 and 3) is conventional and varies, dependent upon the power source, computer capability, location, etc. Also within the computer 54 is located a programmed logic (not shown) to convert the polar coordinates digitized, into Cartesian coordinates, if necessary. Such a circuit is also representative of conventional and simple trigonometric functions, establishing the sides of a right triangle from the angle and hypotenuse (distance) given.

A corner only of tape straightener 166 is shown here, but is fully described below, its purpose being to assure lateral and thrust parallelism of the steel tape 34.

Similarly, a tape cleaner 168 will be later described. Its purpose is to prevent dirt, dust, and foreign particles from entering the internal workings of digitizer 10.

It will be recognized that when the steel tape 34 is extended from the inner housing 14 it is also extended from the steel tape case 114. The sprocket holes 118 are engaged by the sprockets 119, rotating the roller 40 and the pinion gear 134 (counter-clockwise as pictured). The pinion gear 134 rotates the gear 144 and the encoder shaft 44 clockwise, changing the signal within the encoder 46 and feeding such change, via the wire bundle 150, to the computer 54.

When the steel tape 34 is pushed back into outer housing 14 it is guided by the rollers 120, 122, and 124, causing the sprocket holes 118 to engage with sprockets 119, movement of the tape 34 thereby causing the roller 40 and the pinion gear 134 to rotate clockwise. The pinion gear 134 meshing with the gear 144 causes it and the encoder shaft 44 to rotate counterclockwise, thereby causing the encoder 46 to reverse the electrical signal, via the wire bundle 150 to the computer 54.

Again, it is emphasized that the encoder shaft 44 can be an extension of the shaft 136, eliminating the pinion gear 134, the gear 144, the bearings, and hardware not shown. With such an embodiment the encoder 46 rotates in unison with the roller 40. The effect then is that the encoder 46 be a multi-turn device since it requires a plurality of turns as the tape 34 is extracted from and pushed back into the inner housing 14.

As the steel tape 34 is swivelled laterally (from side to side) the tape straightener 166 causes it to remain parallel with the inner housing 14 which thereby rotates in unison with the steel tape 34, as though the two were integral. With each lateral movement the inner housing 14 rotates about the axis 16. The encoder shaft 19, an extension of the axis 16, is integral with the inner housing 14. Therefore, any lateral movement of the steel tape 34 causes the encoder shaft 19 to rotate within the encoder 18, causing an electrical signal change which is fed via the wire bundle 164 to the computer 54. As the steel tape 34 is extracted from and pushed into the inner housing 14 (Y and $Y_1$), such movement is converted by the encoder 46, from the communication language of distance ($A_1$, $B_1$, $C_1$, and $D_1$ of FIG. 2) to that of electrical signals. As the steel tape 34 is moved laterally (from side to side, X and $X_1$), such movement is converted by the encoder 18, from the communication language of angular movement ($A_2$, $B_2$, $C_2$, and $D_2$ of FIG. 2) to that of electrical signals. The combination of these signals then, constitute polar coordinates which are fed to the computer 54.

Figure 7:
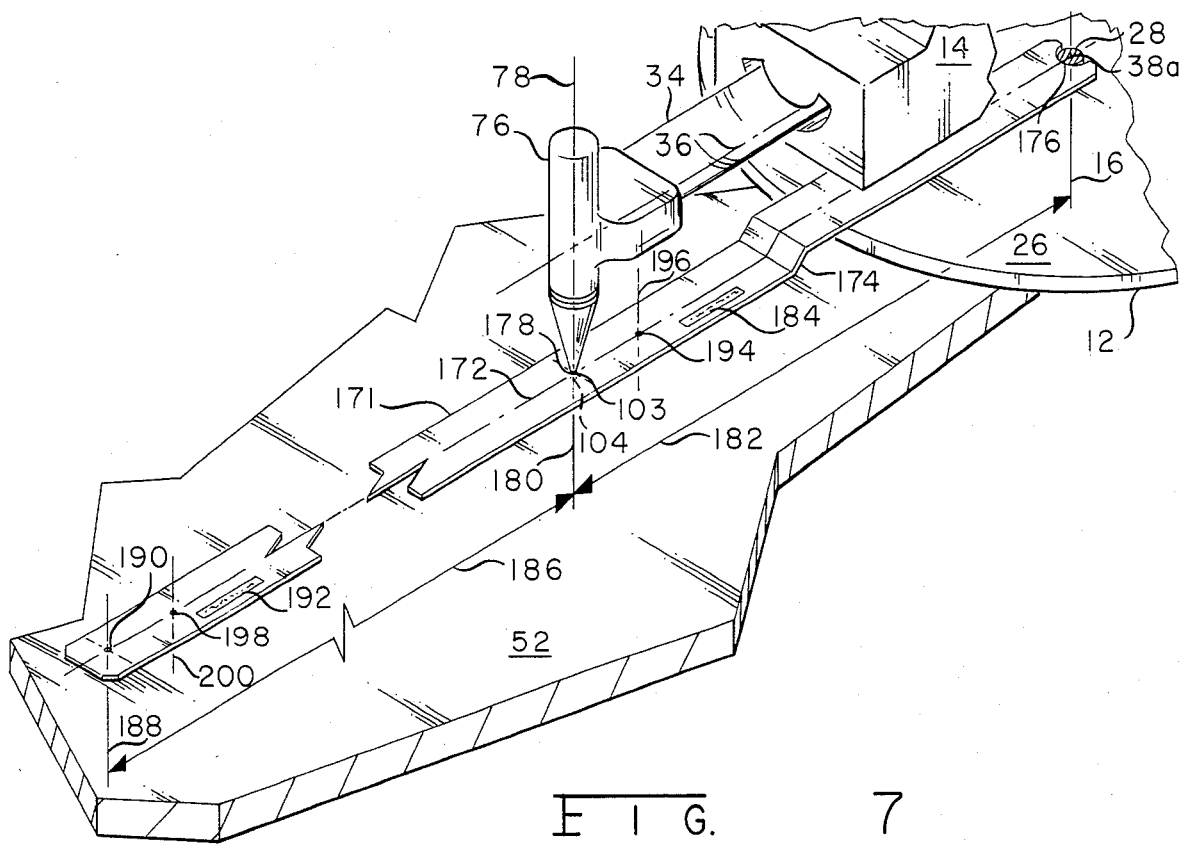
FIG. 7 is an isometric diagram illustrating a measuring beam for setting the "distance" measurement standard for polar coordinates.

The manner in which the vertex 38 (FIG. 1) of the polar coordinates, as shown in FIG. 2, is established and used is detailed with respect to FIG. 7. This vertex 38 is the coordinate point of the axis 16 and the centerlines of steel tape 34. The description of FIG. 6 has established the fact that this coordinate does exist due to the careful centering, within inner housing 14, of their related components.

Further, as described with respect to FIG. 6, and as shown in FIG. 1, the vertex 38 lies on the axis 16, which is an extension of the encoder shaft 19. Hence, when the encoder shaft 19 is rotated laterally the electrical signal produced by its encoder 18 is synchronized with the vertex 38 to measure the polar coordinates relative to "angle". Since the shaft 44 of the encoder 46, which measures distance, does not have an axis in alignment with the vertex 38, some means is required to synchronize the vertex 38 with the voltage of the encoder 46 and the physical distance between the vertex 38 and the tip 104 of the stylus 76 (FIG. 7).

The shaft 28, shown in section for reasons of clarity, protrudes along the axis 16 from the housing floor 26. It is cut immediately beneath the shoulder 113 that supports the bearing 30 as shown with FIG. 6.

Slid along the floor 26 and abutting the shaft 28 is a measuring beam 171, having a centerline 172. It is held in place by hand, by tape, or any other convenient method. The measuring beam 171 contains a step 174 which permits the opposite end of the beam to lay flat upon the drawing surface 52. Above the floor 26 of the outer housing 12 can be seen a part of the inner housing 14 which is rotatable about the axis 16. The steel tape 34, shown partially extended from the inner housing 14 has the stylus 76 attached thereto, the bottom cover having been removed. Since the intersection of the steel tape centerline 36 and axis 16 establish the vertex 38, the intersection of the beam centerline 172 and the axis 16 at the crossection cut of the synonymous with vertex 38 in relation to the measurement of distances.

The upper end of the measuring beam 171 is finished with a radial cut 176 whose radius is slightly larger than the radius of the shaft 28. Since the diameter of the shaft 28 is closely controlled and has an extremely small tolerance, its radius, (from vertex $38_a$), added to the end of measuring beam 171 at its beam centerline 172, constitutes a measurement from axis 16 and/or alternate vertex $38_a$.

When the measuring beam 171 is pressed against shaft 28, the centerline 172 of the measuring beam 171 is coaxial with a centerline of shaft 28 that obviously passes through alternate vertex 38$_a$ (axis 16). In order to measure distance 182, I must add the radius of shaft 28 (which I know is from axis 16 and/or alternate vertex 38$_a$) to the measurement from centerline 180 to the end of the centerline 172 on beam 171.

The measuring beam 171 shown broken, may be of any desirable length 186, but its length from the centerline 180 to the centerline 188 of a hole 190, which bisects the beam centerline 172, is usually 2-8 feet. The hole 190 is preferrably equal in diameter to the hole 178. The distance 186 is also engraved or stamped at 192 into the surface of the measuring beam 171, and distance 182 is stamped at 184.

The measurements of the distances 182 and 186 should be precise, carefully controlled, and made under environmental conditions similar to those temperature ranges within which the electronic equipment is entended to be used.

Synchronization of the polar coordinate, for physical distance from the axis 16 (one form of communication) to voltage (another form of communication), may now be accomplished.

Such synchronization has been taught extensively in my patent application Ser. No. 702,745, entitled "A Measurement Conversion and Visual Display Instrument", although the procedure of the method varies somewhat. That application is incorporated herein by reference for its teaching, as is also my application Ser. No. 783,608 entitled "A Point Location and Graphics Digitizer System".

For the following distance/voltage synchronization the words "voltage resistance" and "pulse count" are used substantially interchangeably. It should be understood that with a shaft angle type of encoder, the words "shaft angle" may also be substituted, as may any similar term which would signify electrical measurements which determine rotational measurements for the particular kind of encoder involved. Therefore, even though particular ones of these terms are sometimes used in connection with a specific type of encoder, it will be understood that others of these terms may be substituted as appropriate.

In a typical procedure a first pulse count reading is taken when stylus shank 103 is in the hole 178, with its tip 104 making contact with the drawing surface 52. Note: Although the distance between the axis 16 and the centerline 180 is known, the pulse count between the axis 16 and the centerline 180 is not known at this time.

This procedure is then repeated with respect to the hole 190 and an electrical pulse count reading is taken at that distance. The resulting total pulse count is proportional to distance, and the first reading, subtracted from the second, will be the pulse count for the distance 186. The pulse count reading for the distance 182 may now be calculated. Thus, the (known) pulse count of the (known) distance 186 is to the distance 186 as the (unknown) pulse count of the distance 182 is to the (known) distance 182.

The means for accomplishing a "zero" adjustment (a normal circuit attached to any type encoder) for distance, on a zero and span circuit, is then made by again inserting the stylus 76 into the hole 178, again reading the pulse count, and subtracting from it the count for the distance 182. This count then, is that for the alternate vertex 38$_a$ (or vertex 38, or centerline 16), at which the "zero" adjustment for distance is set.

The stylus 76 is next extended to the hole 190 and the "span" adjustment is set for the distance from the centerline 16 (distance 182 plus distance 186). Following these adjustments, all distances indicated by the stylus 76 (whether shorter, the same, or longer than distance 186) will be in proportion to the span adjustment, read by the encoder 46 and communicated to computer 54.

Figure 8:
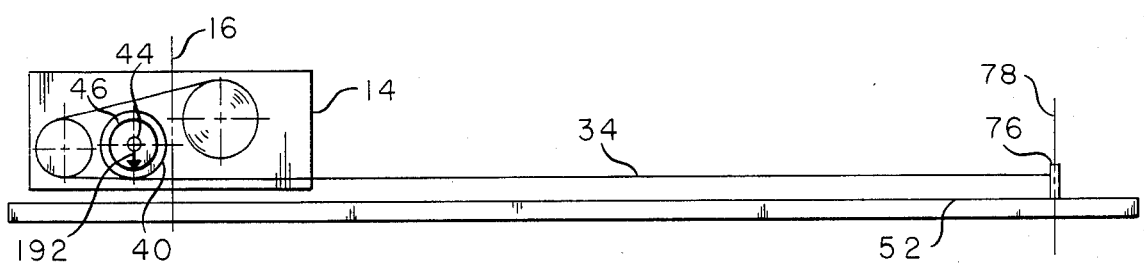
FIG. 8 schematically represents the relationship of a housing and an axis relative to physical adjustments to the system.

FIG. 8, a semi-schematic representation of FIG. 1, depicts the inner housing 14 and the axis 16 in relation to other components, especially the encoder 46, to indicate the particular care that must be exercised when making those adjustments described with respect to FIG. 7.

The encoder 46 is shown schematically as being driven by the roller 40 upon its shaft 44. The shaft 44 is driven by steel tape 34 as it is moved into and out of the inner housing 14.

Depending upon the type of encoder utilized, the arrow 192 represents a wiper, a beam of light, or etc., regulated by the shaft 44. One complete revolution of the arrow 192 is representative of Pi (3.14159 ... ) times the diameter of roller 40. This distance is representative of that distance over which the steel tape 34 is extended from the axis 16, and at each full revolution of arrow 192 within encoder 46.

Depending upon the type of encoder 46 used, care must be exercised to assure that a voltage resistance or pulse count equal to the length of steel tape 34 extended, is in fact being measured. Some encoders such as potentiometers, have dead bands, the resistance of which cannot be measured as voltage. Some also have low and null voltage areas that are extremely difficult to measure.

Should the encoder 46 be of the kind described, it should be tested, for example, with a voltmeter, as its mounting clamps are loosened and the encoder is rotated into position in a counter-clockwise direction. When it has been assured that its wiper (arrow 192) is in the measurable resistance range, its mounting clamps are retightened and the measurements, such as explained for FIG. 7, are resumed.

Figure 9:
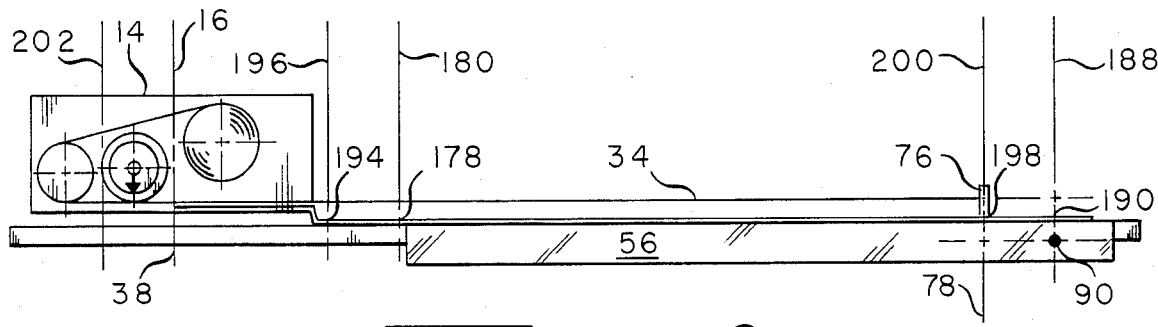
FIG. 9 is an additional schematic representation and shows another adjustment to depict a light spot.

FIG. 9, a semi-schematic representation similar to FIG. 8, depicts the dot 90 (see FIG. 4) preceeding the stylus 76. It is shown immediately below and in line with FIG. 8, to illustrate that as the tape 34 is pushed into and out of the inner housing 14 by the stylus 76 the dot 90, nevertheless, always appears on the visual display area 56 as being the same distance from axis 16 as the stylus 76 is from axis 16 in FIG. 8.

This objective can be accomplished with a variety of electronic techniques and circuit components. However, a typical method may be clearly stated as follows:

Returning temporarily to FIG. 7, the procedure for determining the "zero" and "span" adjustments for distance synchronization with pulse counting is accomplished by utilizing the known measurements of the beam 171, and the distances 182 and 186 on that beam, and then determining the pulse count for the distance 182. This same procedure is followed, with respect to the distance between axis 16 and centerline 196 of hole 194, and the distance between the centerline 196 of the hole 194 and the centerline 200 of the hole 198. Circuitry for automatically establishing such adjustments may be provided.

It is noted that the hole 194, with its centerline 196, and the hole 198, with its centerline 200, are substantially identical in diameter to the holes 178 and 190. The shank 103 is sometimes tapered to provide a self-centering capability when inserted into various ones of these holes. The distances from the centerline 180 to the centerline 196 and from the centerline 188 to the centerline 200 are also equal measurements at any desired distance, i.e., about 1-2 inches, for example.

The centerline 196 and 200 (FIG. 9) are shown as being equadistant from the centerlines 180 and 188. A new reference centerline 202 is also depicted at the same distance from the axis 16.

With this embodiment, a second zero and span circuit is used in the circuitry of computer 54, electrically, parallel with the zero and span circuit used for FIGS. 2 and 3. Ahead of these circuits within computer 54 is positioned a switch (not shown) for switching from one zero and span circuit to the other.

For use with the second zero and span circuit the measuring beam 172 is placed in the same position as in FIG. 7, and the same readings and calculations are taken. Here, however, when the "zero" adjustment is set, the stylus 76 is inserted into the hole 194 during the setting. During the setting of the span adjustment the stylus 76 is inserted into hole 198. Although the axis 16 seems to have been moved back to centerline 202 this is inconsequential: since only that point on tape 34 is moved back to this centerline 202. For purposes of distance, the pixel or dot 90 within the visual display 56 is energized from the pulse count corresponding to the distance from axis 16.

The effect of this embodiment is analogous to synchronizing "distance" with "voltage", as explained for FIG. 6, and then cutting stylus 76 from the steel tape 34, moving it back 1-2 inches, and re-attaching it.

Figure 10:
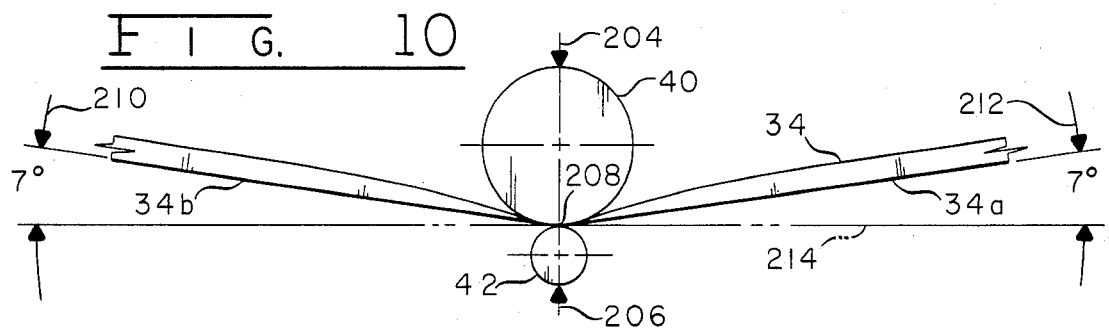
FIG. 10 is an orthographic depiction of the steel tape of this invention, with stress applied to it.

Moving now to FIG. 10, this is a simple orthographic depiction of the deformation of the steel tape 34 when stress forces are applied to it by the roller 40. Since many claims of precision, straightness, and lateral rotability of the steel tape 34 are dependent upon the reactions of the tape to such stress forces, these forces must be considered when a steel tape of the nature described is used in the manner set forth with respect to this invention.

As the steel tape 34 is flattened between the rollers 40 and 42, with the respective forces 204 and 206 being applied as indicated, and dependent upon the curvature, width, and thickness of steel tape 34, that tape will deform at equal angles, of approximately 7 degrees each, away from the point of tangency 208 of the rollers 40 and 42, and in the direction of the curvature of the steel tape 34. If an attempt is made to again straighten the steel tape 34 by the application of forces in the direction of arrows 210 and 212 of the 7 degree angles, two reactions become increasingly prominent: (1) The forces 204 and 206, required to flatten the steel tape 34 multiply rapidly; and (2) The steel tape 34 looses its rigidity and each leg 34$_a$ and 34$_b$ tends to wobble from side to side.

It will be recalled that the steel tape 34, when used as described above, must be parallel with reference line surface 214 outward from the roller. Therefore, the roller 42 must be rotated about the roller 40 in an amount at least equal to one of the equal angles produced by steel tape 34. Example: If the conditions described above caused the steel tape 34 to produce equal angles of 7 degrees on either side of the rollers, then if the steel tape leg 34$_a$ is to be brought parallel with the surface 214, the roller 42 must be rotated clockwise about the roller 40 a minimum of 7 degrees and the case containing the steel tape must also be rotated clockwise a minimum of 7 degrees about the roller 40.

Figure 11:
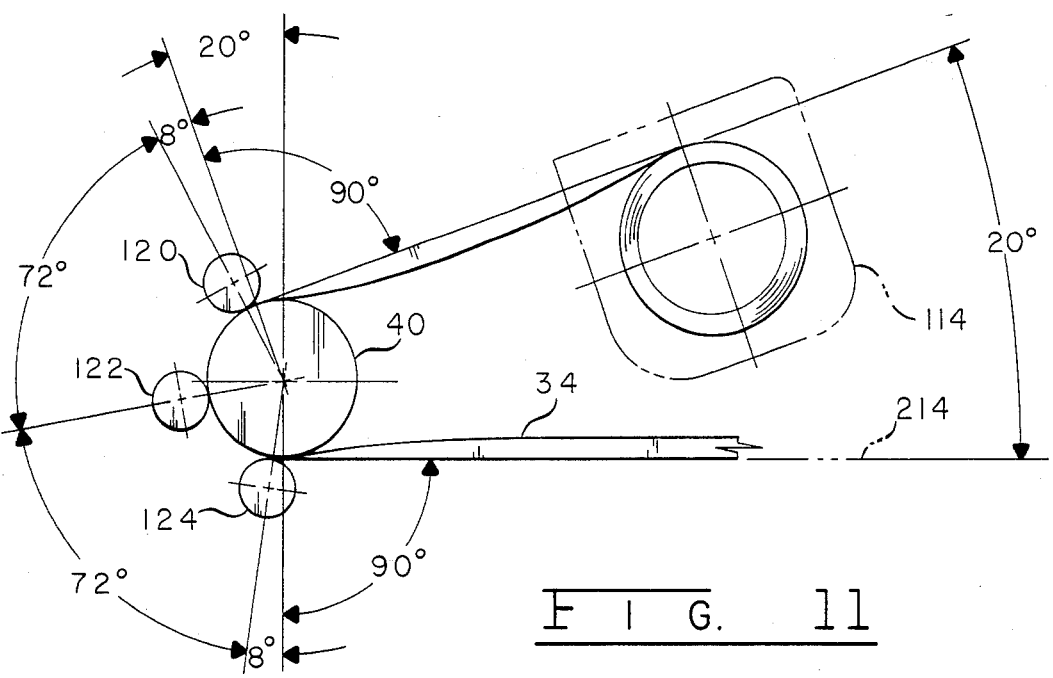
FIG. 11 is an orthographic side view of the steel tape, from the tape case, being supported as it is fed around a cylinder.

FIG. 11 is a simplified orthographic side view of the tape and roller arrangement shown in FIG. 6.

Therein a steel tape case 114 is inclined at a 20° angle from a horizontal plane so that the roller 40 makes contact with and drives the steel tape 34. In order that the steel tape 34 be horizontal and parallel with reference line 214, the roller 124 is rotated about the roller 40 a total of 98 degrees from the steel tape 34. The above is also true, only in a counter-clockwise direction, for roller 120 from the inclination of the steel tape case 114. The roller 122 bisects the axes of the rollers 120 and 124 to serve as a pushing and guiding force for the steel tape 34 around the roller 40.

With such an arrangement, especially when an encoder is mounted upon the axis of the roller 40, the length of movement of the steel tape 34 is Pi times the diameter of the roller 40. Also, with such an arrangement, steel tape 34 maintains its rigidity for lateral movement.

Figure 12:
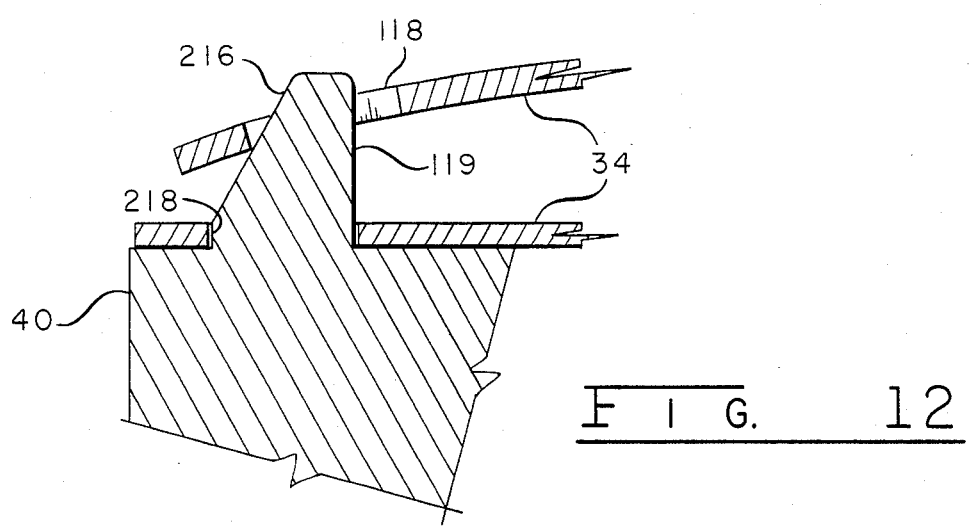
FIG. 12 is an orthographic cross-sectional view of the sprocket engaging a sprocket hole in the tape.

FIG. 12 is an enlarged cross-section illustrating the action that takes place between a sprocket hole 118 in the steel tape 34 as it engages with the sprocket 119 upon the roller 40. An inclination 216 on sprocket 119 guides the steel tape 34 to a sprocket alignment land 218 as the steel tape 34 drives sprocket 119 and the width of the steel tape 34 flattens around wheel 40.

The isometric view of FIG. 13 shows the preferred embodiment of a tape straightener 166 used with this invention. Its purpose is to ensure lateral rotation of the inner housing 14 as the steel tape 34 is laterally rotated to obtain the angular measurement of polar coordinates.

A base plate 220 is slid into and fixed within vertical notches 222 and 224 in the inner housing 14 by two set-screws 226 and 228, thereby aligning the axis of the tape straightener 166 with those of the inner housing 14.

Looking now at FIG. 14, a rear view of the tape straightener of FIG. 13, it will be noted that the base plate 220 contains an aperture 230, which allows the steel tape 34 to penetrate through the base plate 220. A bottom support 232 at the bottom of the aperture 230 is attached to the base plate 220 with a plurality of machine screws 234. The bottom support 232 is preferably shaped flat to support the curvature of steel tape 34. It is normally composed of thermoplastic with a good surface hardness and a low coefficient of friction, the tape to easily slide along its top surface.

A top support 236, usually composed of the same material as the bottom support 232, is attached to the base plate 220 by machine screws 238 and 240 through slots 242. These slots allow the top support 236 to rest upon the curved-up edges of steel tape 34. Machine screws 238 and 240 are then tightened to prevent vertical movement of the steel tape 34.

Two side supports 242 and 244 (FIG. 14) usually of the plastic material just described, are mounted against the base plate 220, by a pair of shoulder screws 246 and 248.

Each side support, if not otherwise retained, can swivel about its mounting screw. Therefore, holes 250 are provided adjacent to one another in the inner side walls of the side supports 242 and 244. Their hole diameters and depths accommodate a compression spring 252, forcing the side supports against the wall of the inner housing 14. Located on the outer walls of the housing 14, in line with the side supports, are machine screws 254 and 256. These screws are adjusted inward against side supports 242 and 244 until the side supports contact the tape 34. The inside wall of each side support, through which the steel tape passes is beveled to contact the tape 34 near the point of tangency of its curve. Locknuts 258 are then tightened to prevent lateral movement of the steel tape 34.

Adjustments of the tape straightener assembly 166 are normally made with the steel tape extended a maximum length from the inner housing 14. With each adjustment, the tape is pushed into the inner housing and then extended again to assure its alignment with other components within the inner housing.

The tape cleaner 168 of FIGS. 15 and 16 prevents dirt, dust and other foreign particles from entering the inner workings of the digitizer. It consists of a bottom segment 260 and a top segment 262, each having a pair of slots 264 for mounting that segment against the two outer walls of inner housing 14 with screws 170.

The cross-sectional view of FIG. 16 shows the bottom segment 260 cut inwardly in the form of a radius 266, and slightly larger than the curvature of teel tape 34. It includes a groove 268, usually containing a felt wiper strip 270. The top segment 262 is similarly cut in a radius 272, slightly smaller than that of tape 34. Its groove 274 also contains a felt wiper strip 276.

The perspective view of FIG. 17 shows this invention being used with conventional design and drafting equipment in conjunction with contemporary audio visual electronic equipment arranged as a simple computer graphics system for graphics electronic visual display and storage.

A conventional drafting table 280, is shown supporting an array of drawing instruments that may be used with the invention, including a drafting machine 282, a scale 284, a triangle 286 and a drawing pencil 288. Taped in the normal fashion to the surface 279 of the drafting table 280 is a sheet of drawing paper 290.

On drawing surface 52 is a representative drawing 292 of irregular shape. The drawing 292 has been either prepared in place with the drawing instruments shown, or prepared elsewhere and taped to the drafting table surface in a conventional manner.

Conveniently attached to drafting table 280 is the digitizer 10 encased in a cover 294. Normally encased within the same cover 294 is a receptical 296 containing electronic equipment used in conjunction with this invention. Also as a part of the cover 294, or as an integral extension of the outer housing 12 (FIG. 6), is a receptical 298 which normally retains and stores the stylus 76 when it is not in use.

The steel tape 34 may be extended and moved through an aperture 300 in the cover housing 294, permitting greater than 180° of lateral rotation. Thus, the stylus 76 may withdraw steel tape 34 from cover housing 294, unobstructed, and be moved to any point on the drawing surface 52.

A computer 54 (briefly mentioned in relation to FIGS. 2 and 3), together with a tape receiver 302, representative of tape, disk, or any acceptable electronic signal recording means, are shown placed on the drafting table 280. Together with conventional recording control switchs, dials, etc., at 304, are a series of keys 306 which are representative of any number of keys or controlling devices normally found on the keyboards for contemporary visual displays. The computer 54 may be either mini or micro and may contain any number of circuit components, dependent upon computer requirements and drive-size relationships of the current state of the art; or it may be interconnected with a larger master computer at another location.

Illustrated in a position for best viewing by the digitizer operator is a visual display 308, contained in its cabinet 310. This display is intended to be representative of any visual display employing any science for the production of images through electronic means.

My above-mentioned application entitled "A Point Locator and Graphics Digitizer System" includes teachings relating to producing, recording, and manipulating electronic signals from encoding devices such as used with this invention and all such teachings are considered to be available for use here. For example; the wire 312 connected to the digitizer 10, the wire bundle 314 connected to the computer 54, and the wire 316 leading to the pushbutton receptical 318, with its pushbutton switch 320, are all interconnected to cooperatively record the polar and/or cartesian-converted coordinates of the point location at the tip 104 of stylus 76 when the pushbutton 320 is depressed.

With the interactions of the equipment shown and explained, it is now possible to visualize the basic techniques for electronic drafting and design, as well as techniques for numerical control storage which are made possible by this invention.

In FIG. 17, once the reference point 48 (FIG. 2) and its analogous reference point 50 on the visual display have been established, the tip 104 of the stylus 76 is used to locate the polar "angular" and "distance" coordinates 322 and 324 upon the drawing surface 52. These coordinates are electronically converted, through the means described, to the coordinates shown as 326 and 328 on the visual display 308. They represent the "pixel" or intersection of two lines of pixels within visual display 308.

Polar coordinates 322 and 324 and, in turn, each of the other polar coordinate points upon the drawing surface, are thereby digitized. This procedure continues until the digitization of the entire drawing 292 is completed. This is shown as an image 330 on the visual display 308.

It should be noted that while the drawing 292 is being digitized, the visual display 308 need not be viewed, or even be available for observation, since digitizing can be accomplished and the results stored in the recorder 302. This stored information may be "played-back" into a visual display at any time and displayed as an image at that time. Additionally, recordings may be so stored upon any one of a number of tape systems available for this purpose.

Utilizing the simplified system described, basic shapes such as the circle or hole 332 may be either digitized directly or detailed with the function keys 306. The circle outline can be recorded from a radius point 334 by so specifying.

Third dimensions of depth can be recorded at each coordinates location while digitizing. The depth lines 336, for example, are shown lightly in visual display 308 to depict the existence of information contained within the storage of the computer 54.

There exist various means, as well as degrees of precision, to digitize information for the drawing 292. For example; digitizing between the two coordinate locations 338 and 340 of the drawing 292 can be accomplished by sequentially placing the stylus tip 104 at the points 338 and 340 and, in turn recording and/or displaying each point. The computer can then be programmed, and by depressing a function key, join those two points, shown here as line 342 in the visual display. Hence, the line 342 is merely a display of the connection between two analogous points within the drawing 292. A more precise method is to first; locate the point 338, next instruct the computer 54 to produce a vertical line (or axis) below it, then key in the length of the line to any desired number of decimal points. The computer will then produce the line 342 on the visual display, to the closest proximity, or resolution capability of the equipment. If the visual display 308 is not resolute to the number of decimal points keyed into the computer, it will display the line 342 to the closest cross resolution lines, or pixel point, available. Later, if the computer-stored information is used in numerically controlling a machine operation for producing the keyed-in length, the original length stored (to any number of decimal points) remains the criteria for the machine operation. Any limiting factor would be due to the capability of the machine tool used.

Lines of various thicknesses can be conventionally programmed. Thick lines, such as line 344, shown in the display for outline purposes, the medium thickness line 346, shown as a dimension line, thin line 348, shown for center-lines, or any other line widths, may be selected by function keys for display. Further, any lettering style may be programmed and used for legends, notes, etc., or for dimensioning numbers such as 350. When letters or numbers are shown, they may be displayed for readability from any position around the drawing. This is accomplished by first indicating the location of the first letter with the stylus, then rotating a dial, such as 352, for rotational lettering orientation. When the letters are typed in with keys, such as keys 306, they will then be displayed in the selected orientation. Also, the dimension arrow 354 and other basic shapes may be located, keyed in to the computer, and similarly displayed for orientation purposes.

It will be recognized that many digitizing, storing and visual display capabilities are inherently possible with only the basic and simplified computer graphics system shown. As explained, the system shown need not be accompanied with a visual display. Part of its flexibility is that it is self-contained and can be arranged on any drawing table, at any time, and to fit into any environment.

FIG. 18 shows the digitizer of this invention, in a unique desk-type arrangement, incorporating audio/-visual electronic equipment, and being computer programmed. It also includes in this integrated system; design, drafting, and numerical control functions. New, unique, less expensive, and more sophisticated methods for producing such functions are described in connection with this digitizer system.

A table 356 of any size or shape contains a visual display 308. This display is representative of any available graphics display, such as a cathode-ray tube, light-emitting diodes, liquid-crystals, electroluminescence, a/c plasma panels, electrochromic, magnetic-particle, dye-foil, cathodeluminescence, etc., or any other display capable of producing an image in conjunction with analog or digital electronic signals.

The representative visual display 308, includes, for example, the image surface 358 mounted within the table 356, whereby its image surface is a part of the top surface 359 of the table; or the lens reflected, displayed upon a glass, transparent surface, or screen, or otherwise reflected in any way as an image upon the surface 359. A recepticle area 360 is usually a containment area for displays and/or projection equipment and may vary in size with the visual display technique used. The computer 54 contains, in this instance, an alpha-numeric keyboard 362 having alpha-numeric keys 364, and functions representing those of any conventional visual display keyboard with computer-function capabilities. The alpha-numeric digital display 366 is also representative of contemporary digital displays.

Electrically linked to the computer 54, the recorder 302 includes controls 304. These controls are representative of any conventional computer recording and electronic program storage device. Computer storage tapes 370, discs or the like, can be conveniently stored within storage compartments such as 386.

A new and unique feature which this electronic system makes possible is an arrangement for "menus" used in conjunction with the computer graphics storage and instant recall equipment. Thousands of programs have been or are being developed which can be used. One program, for example, may be pictorial representations of one or many kinds of bolts: others for a variety of nuts, screws, brackets, fittings, plates, angles, beams, switches, etc., that have been programmed for visual display, and relating to numerous design disciplines are also available. These programs are stored in the memory of the computer 54 for recall, playback and use.

These pictures, as well as data for calculations, such as stress analysis, material composition, etc., or for material availability, manufacturer, cost, etc. may be included.

The availability and use of such data is critical to the success of a computer graphics system needed by a designer to avoid consuming excessive amounts of time whenever a design is formulated.

A problem exists in keying such programs to a computer. For example; a printed circuit digitizer must have a printed circuit behind each picture and a light-pen digitizer will only digitize upon a visual display. Because of such limitations, most computer graphics systems have resorted to converting menus to codes that are, in turn, keyed-in to the computer with the keyboard.

A receptacle 368, shown in the top of the table 356, or which may be a receptacle resting upon the surface, contains a menu book having menu pages such as 374. Each menu page contains numerous menus separated into grid areas of pictures or alpha-numeric data. Above the menu receptacle is a keyboard 378 linked electrically to the computer 54 and programmed for keypunching to the computer, any item included within the menu book. Pages may be turned, or the book may be replaced, by the use of finger guide slots 368a and 368b. The method by which any menu such as 376 may be located with digitizer 10 and instantly used will be described below.

Stored within a bookshelf 380 are additional menu books 372 and reference materials 382 used with such a system. Spare storage draws and 384 and 386 may be provided for obvious purposes.

A plurality of mode prints 388 are positioned along the bottom of the board 356 for selecting various currently used computer capabilities, such as rotation of views, erase, reduce, enlarge, move, etc., of an image such as 330. Below the keyboard 362 are dials 390 used to rotate lettering, symbols, etc., and immediately below them are pushbuttons 392 (of the nature of the button 320 in FIG. 17) to indicate locations of coordinates produced by the digitizer 10.

To the left of the visual display 308 is a small digital display area 394 adjacent three dials 396, 398, and 400. The digital display 394 indicates degrees of rotation of the image 330. The dial 396 rotates the image 330 clockwise or counter-clockwise, as shown in its plane of projection, the dial 398 rotates the image 330 to display the bottom or top, and the dial 400 rotates image 330 to display its sides. The logic to accomplish this follows the geometrical logic that all objects have three perpendicular axis and can be rotated into any position by a series of rotations, rotating two axes about the third.

To the left of the digitizer 10 are four color mode locations, red 402, yellow 404, blue 406, and black 408, for example. It is common practice to produce drawings such as are stored upon tape storage or the like, with an x-y plotter by using ink-fed pens. These plotters have become quite sophisticated and it is not uncommon to produce drawings such as image 330 at a rate of more than 20 inches of line per second. These "plotters" usually have a built-in capability to switch from black, for example, to any of the three primary colors red, yellow and blue. Through various combinations of these colors, other colors such as orange, green, and violet may be produced. It is also well known in the computer graphics field that the production of multi-colored engineering, architectural, and other types of drawings can be accomplished.

An on-off swich 410 energizes this system. The digitizer 10 then functions are previously described to locate polar coordinate points.

FIG. 18 depicts four different modal areas: (1) a visual display image surface 358; (2) mode point (or location) selection, such as 388; (3) the modal area for black and white or color, such as 402, 404, 406 and 408; and (4) the modal area represented by the menu book 372.

Each of these four areas represents addressable locations to which the stylus 76 can be drawn. Within each area a specific address is categorized, fed to the computer 54, and the specific mode function selected is performed. Such specific addresses are synonymous with keyboard digitizing used with current computer graphics systems. Here, however, when the stylus is drawn to a specific function address location, that function can be performed immediately because the location of the stylus signals to the computer the function to be performed. With the keyboard technique, a code must first be determined from such as a function dictionary. The code to perform a specific function must then be keyed to the computer.

With the system illustrated by FIG. 18, the dot 90 may represent a location being generated by the encoders within the digitizer 10. This dot precedes the stylus 76 when the alternate zero and span circuit is being used, as described in relation to FIG. 9. Thus, as an example, when the push-button 414 is depressed, the signal generated is then under the pad 86 at the bottom of the cover 84 on the stylus 76, and under the tip 104 (not shown). Therefore, whenever modal areas other than image surface 358 are addressed, the push-button 414 is depressed.

Notice that each specific mode address (specific menu item, etc.) is a relatively large location area consisting of many coordinates. Any of the coordinates within that chosen area can be representative of the address for that function. It is not necessary that the center of the pad 86 (representing tip 104) is centered above any specific coordinates, since all coordinates within that "outlined" address (example—the square containing the picture of a menu item) will signal to the computer to produce the function so specified.

Prior to producing the image 330, and as explained relative to FIG. 17, coordinates are first keyed to the reference point 50. The reason for reference point 50 is for ease of coordinate orientation should it be found desirable that the image 330 be reused, especially on another similar table for corrections, additions, changes, etc.

The image 330 is "electronically" drawn for FIG. 18 similar to the manner in which it was drawn for FIG. 17. Here, however, it is assumed that the image produced represents direct design rather than a copy of a design, as depicted by the drawing 292 in FIG. 17, and as explained relative to FIG. 2, it is designed utilizing only those features presented for FIG. 18.

The showing of holes 416 and others such as 417 is accomplished by first rotating the image to that plane by rotating the dial such as 400 or 398 and then keying in the proper functions, or selecting them from the menu. Brackets 418 and the like may either be constructed or taken from a menu book and placed at the location chosen. Similarly, the bolt 420 may be "lifted" from menu 376 with the stylus 76 and placed at location 422, using the coordinates shown by the tip of the stylus 76.

The program logic and computer operations necessary to perform the operations explained above are contemporary with current computer graphics technologies. With digitizer 10, however, the electronic drawing system is made possible whereby visual displays, such as 308, can be an integral portion of the table. Also, with this system any digitizing desired can be accomplished with a stylus, even though alphanumeric data is usually performed by the use of a keyboard.

No attempt has been made to explain all of the merits of the digitizer 10, with its numerous capabilities and functions, as included with conventional computer graphics systems. Those explained are representative only of the many possibilities available in applying the digitizer 10 to a broad spectrum of potential uses. By combining the methods shown and explained relative to FIGS. 17 and 18 many and varied possibilities are opened for a self-contained system, or a system whereby different operations may be performed by different operators at different locations, the data being used jointly or interchangeably.

FIG. 19 is an isometric view depicting a writing instrument and cursor guide, that are at times used with this invention.

Glancing briefly at FIG. 17, the tip 104 of the stylus 76 normally will remain in the same vertical plane as the centerline of steel tape 34, especially when the tip 104 is being positioned by supporting steel tape 34 with the index finger being immediately behind stylus 76. This is particularly true when the stylus 76 is not top-heavy and the majority of its weight is below the top side edges 34a and 34b (FIG. 19) of steel tape 34.

Turning now to FIG. 19, a writing instrument 105a is shown penetrating through the cursor element 424. The writing instrument 105a is a relatively new, but commercially available, type of mechanical drawing pencil that is usable in conjunction with the cursor element shown. It employs a push-button top 246 that, when depressed, opens a chuck encased within its bottom tapered shank 428. The chuck, in turn, releases a drawing lead, such as the 2 mm lead 430 illustrated. The lead, because of its small diameter, is supported by a sleeve 432 to prevent its breakage.

Since the writing instrument 105a is designed to be used in a perfect vertical position, its use with the instrument of this invention is ideal. When it penetrates the cursor element 424, the majority of the weight of the cursor assembly is located above the steel tape 34. The result is that the edges 34a and 34b at the cursor end of the tape will tend to roll in the directions of $R_1$ or $R_2$, causing tip 104a to rotate out of the vertical plane. This is especially true when the tape 34 is extended to extreme lengths, thereby increasing its flexibility.

The purpose of the cursor guide, generally shown as 434, is to assure that the stylus centerline 78 will remain vertical at all times, perpendicular to the centerline 36 of the tape 34.

The cursor guide 434 normally consists of a main body 436, two oppositely extending legs 438 and 439, and a pair of vertical support clamps 440 and 442. When these clamps are secured about stylus 76a by adjusting a knurled captive screw 444, the cursor guide 434 forms a tripod with the stylus 76a and the writing instrument 105a, becoming the third and vertical leg of the tripod.

It may be noted that the stylus 76a is machined to accept the clamps 440 and 442 that rest upon a lip 446, thereby preventing any downward movement of the clamps on stylus 76a. Also, when clamped about the stylus 76a, with the captive screw 444 being firmly adjusted, the cursor guide 434 may be rotated, its axis 448 being thereby rotated about the stylus centerline 78. Thus, when the main body 436 is held with one's fingers, cursor guide 434 may be easily rotated (shown by arrows $S_1$ and $S_2$) so that it will not interfere with the steel tape 34 while digitizing is being performed.

The legs 438 and 439 normally include a pair of tips 450 composed of a "self-lubricating" thermoplastic to assure that they will slide easily upon drawing surface 52. Hence, as a line 452 is drawn upon drawing surface 52, the legs 438 and 439 slide over the surface in the direction indicated by reference lines 454 and 456. In FIG. 19, the ruler 458 is representative of any instrument used for the purpose of guiding the stylus 76a along the line indicated.

The writing instrument 105a is secured firmly within stylus 76a by a knurled retaining nut 460. The specific method of retaining the writing instrument 105a is shown in FIG. 20. Therein the nut 460, threaded onto stylus 76a, compresses an O-ring 462 against a ring 464 which is held in place by pins 466 imbedded into the wall of writing instrument 105a. The resulting pressure of the instrument against the inner wall 428 of the stylus 76a assures a snug and accurate positioning at all times. The O-ring 462, as well as creating a downward pressure against ring 464, centers the writing instrument 105a within stylus 76a, thereby retaining it firmly, and assuring that the lead 430 will be permanently maintained perpendicular to drawing surface 52.

FIG. 21, an isometric view of a portion of cursor guide 434, is illustrated as exploded to depict the simplicity of its construction and use. The knurled captive screw 444, a lock-washer 468, and the clamp 442 form an assembly. When the screw 444 is threaded through tapped hole 470 in clamp 442, the lockwasher 468 and clamp 442 are held by the screw shank 472 and will not slip from it without very careful unthreading back through the tapped hole 470.

Prior to threading the screw 444 into tapped hole 474 of clamp 440, the end 476 of clamp 442 is inserted into a cavity 478 of main body 436. The clamp 442 is locked against the stylus 76a; the pressure being equalized against a wall 480 of the cavity 478 as the threads 482 of screw 444 are threaded into tapped hole 474 of clamp 440. The locking device clamp 440 is normally made integral with the main body 436. It is to be noted that the cursor element 424, the writing instrument 105a and the cursor guide 434 shown in FIGS. 19, 20 and 21 are representative only of components capable of performing the specific functions described and should not be limited to the designs described. Many types of writing instruments exist, any of which may be designed into a cursor element for this invention. The cursor guide may also be designed integral with the cursor element. It may have adjustable legs, or incorporate a different clamping device. FIGS. 19, 20 and 21 depict only one way, of many configurations, to perform the functions described.

I claim:

1. A point location system comprising:
a digitizer including
a normally straight tape being cross-sectionally curved defining a narrow tape width and concave and convex tape surfaces, and the tape including a plurality of holes longitudinally disposed adjacent at least one of its edges; the tape having the resiliency to be bent in a radius toward its concave surface, and the width of the tape being normally flattened where so bent and the tape having the tendency to return to its straight orientation;
a rotatable roller for receiving a length of said tape concave surface bent in a radius thereagainst, and the roller including sprockets for engaging with said holes, and the sprockets including inclinations and alignment lands, and said holes thereby transversely sliding upon said inclinations to said lands as said roller is rotated and said tape width is flattened and said holes engage said sprockets; and
a shaft coaxially mounted to said rotatable roller.

2. The system of claim 1, wherein said tape is extendible and retractable, and wherein said shaft is a rotatable shaft of a position encoder, and the encoder includes means for emitting electrical signals in response to rotational positions of its shaft; longitudinal positions of said tape thereby being converted into electrical signals emitted by said encoder.

3. The system of claim 2, further including a housing for supporting said shaft, said rotatable roller and said encoder; a case for storing a portion of said tape in the form of a coil; and a stylus disposed at the other end of said tape.

4. The system of claim 3, further including guide rollers for sandwiching said tape against said rotatable roller, and wherein two guide rollers are offset circumferentially about the axis of said rotatable roller, said two guide rollers thereby aiding said convex surface of said tape to conform to a radius of said rotatable roller.

5. The system of claim 3, further including a tape cleaner for cleaning the surfaces of said tape being extended or retracted, and generally preventing foreign matter from entering said housing, and wherein said cleaner includes adjustable top and bottom segments, and each segment incorporating wiper means; the top segment thereby cleaning said concave surface of said tape, and the bottom segment thereby cleaning the convex surface of said tape.

6. The system of claim 1, wherein said shaft is the shaft of a position encoder, and the encoder includes means for emitting electrical signals in response to rotational positions of its shaft, and said shaft is coaxially mounted to a gear, and said gear meshes with a pinion gear, and said pinion gear is coaxially mounted to a shaft that is coaxially mounted to said rotatable roller; said encoder shaft thereby rotating proportionately less than said rotatable roller as longitudinal positions or said tape are converted into electrical signals emitted by said encoder.

7. The system of claim 3, further including a second housing having a vertical axis, and wherein the first said housing has means being laterally rotatable within the second housing and about said vertical axis, and wherein said tape has a centerline generally perpendicular to and bisecting said vertical axis, and wherein said tape is laterally rotatable with the first said housing and with respect to the second said housing.

8. The system of claim 7, further including a second position encoder mounted to said second housing and having a rotatable shaft coaxial with said vertical axis, and said second encoder shaft is mounted to the first said housing and is rotatable therewith, and wherein the second position encoder includes means for emitting electrical signals in response to rotational positions of its shaft; laterally rotational positions of said tape thereby being converted into electrical signals emitted by said second encoder.

9. The system of claim 6 or 8, wherein said encoders are selected from those devices known as shaft angle encoders, multi-turn potentiometers, and the like multi-revolution measuring devices.

10. The system of claim 8, further including tape straightening means for accuracy of said tape during rotation thereof, and including slot means for the through passage of said tape, and including tape contacting portions to maintain tape straightness.

11. The system of claim 10, wherein said tape straightening means includes:
 a base plate having an aperture for acceptance therethrough of said tape;
 a bottom support and a top support attached to said base plate, said supports engaging and slidably supporting said tape; and
 adjustable side supports for slidably contacting, positioning and accurately guiding said tape through said aperture.

12. The system of claim 8, wherein said stylus includes a tip for contacting a surface, and said tip has a centerline generally bisecting and perpendicular to said tape centerline, and the tip can be extended or retracted to any point on the surface, and wherein said tape centerline when extending or retracting said tape is generally parallel to said surface.

13. The system of claim 12, wherein said second housing vertical axis is representative of a line from which said extensions and rotations of said tape are determined.

14. The system of claim 13, wherein said digitizer includes means for measuring distances and angles upon said surface and establishing such measurements as polar coordinate signals, and further includes
 a computer having means for storing and recalling data, programming logic relative to said polar coordinate signals and said data, and supplying output data utilizing said polar coordinate signals and said data; and
 a display having means for electronically displaying said output data.

15. The system of claim 14, wherein said means for measuring distances is established by a measuring beam having physical measurements for synchronization with signals of first said encoder, said signals thereby being data communicated to said computer, and said computer storing said data communicated and computing distance polar coordinate signals as measurements proportional to said physical measurements of said measuring beam.

16. The system of claim 15, wherein said measuring beam includes a beam proximal end, a beam distal end and a beam centerline; the beam proximal end having means for abutment against a surface having a known measurement from said line from which said extensions and rotations of said tape are determined.

17. The system of claim 16, wherein said measurement beam includes holes having centerlines generally bisecting and perpendicular to said beam centerline, and said holes penetrating said beam near said beam proximal and distal ends, and wherein measurements are known from said hole centerlines to said beam proximal end; the known measurements thereby being said physical measurements for synchronization, and wherein said physical measurements are marked on said measuring beam.

18. The system of claim 14, wherein said means for measuring angles is established by communicating signals of said second encoder to said computer, and said computer storing said data communicated and computing the polar angle coordinate of said communicated signals.

19. The system of claim 14, wherein said polar coordinate signals are computed by said computer and converted to Cartesian coordinate signals.

20. The system of claim 14, wherein said polar coordinate signals are supplied to said display and electronically displayed as polar coordinates.

21. The system of claim 19, wherein said Cartesian coordinate signals are supplied to said display and electronically displayed as Cartesian coordinates of said polar coordinate signals.

22. The system of claim 8, further including a cursor guide attached to said stylus, and whereby said stylus has a centerline generally bisecting and perpendicular to said tape centerline, and the cursor guide assuring vertical orientation of said stylus centerline, and the cursor guide being rotatable about said stylus.

23. The system of claim 14, wherein a desk-like piece of furniture is provided, and
 said display is provided having an electronic display in the position of a top surface within said desk-like furniture, and wherein
 said digitizer is positioned upon said furniture for utilizing with said stylus tip being extendible or retractable to generally any location upon said top surface of said furniture or electronic display.

24. The system of claim 14, wherein said display is selected from that class of displays including cathode ray tubes, light-emitting diodes, liquid crystals, electroluminescence, a/c plasma panels, electrochromic, magnetic-particle dyefoil, cathodeluminescence, or other displays capable of producing images in conjunction with analog or digital electronic signals.

25. The system of claim 23, wherein cover means is provided over said stylus tip, and said cover means has an end portion for being slid or placed upon said top surface.

26. The system of claim 23, further including means for entering into said computer signals for preprogrammed data to be supplied to said display, and said data is electronically displayed at locations within said display, and the locations where displayed are analogous with locations of distances and angles measured upon said top surface with means of said digitizer.

27. The system of claim 26, wherein said means for entering into said computer are function keys.

28. The system of claim 26, wherein said means for entering into said computer are dials, and wherein said data are lettering, and said lettering is programmed to be rotated by rotating said dials.

29. The system of claim 26, wherein said means for entering into said computer are menus.

30. The system of claim 26, wherein said means for entering into said computer are dials, and wherein said data are representations of geometric objects, and said objects are programmed to be rotated by rotating the dials.

31. The system of claim 26, wherein said means for entering into said computer are color mode indications of a plurality of colors to be used in the eventual production of drawings.

32. The system of claim 26, wherein said means for entering into said computer are mode point selections provided for the selection of any of a plurality of computer graphics capabilities including view rotation, erase, reduce and enlarge size, shift position, mirror image and any selectable computer function of said capabilities.

33. The system of claim 23, wherein said measuring means for measuring distances and angles is a measuring beam providing measurement synchronization means whereby said distances and angles established as polar coordinate signals are displayed electronically as signals extended from said stylus.

* * * * *